US009967273B2

(12) United States Patent
Cazin et al.

(10) Patent No.: US 9,967,273 B2
(45) Date of Patent: May 8, 2018

(54) ABUSIVE TRAFFIC DETECTION

(71) Applicant: Microsoft Technology Licensing, LLC., Redmond, WA (US)

(72) Inventors: Victor Cazin, Paris (FR); Nicolas Rival, Montreuil (FR)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 0 days. days.

(21) Appl. No.: 14/739,787

(22) Filed: Jun. 15, 2015

(65) Prior Publication Data
US 2016/0366168 A1    Dec. 15, 2016

(51) Int. Cl.
| G06F 11/00 | (2006.01) |
| H04L 29/06 | (2006.01) |
| G06F 21/10 | (2013.01) |
| G06Q 20/40 | (2012.01) |
| G06Q 10/06 | (2012.01) |
| G06Q 30/00 | (2012.01) |

(52) U.S. Cl.
CPC .......... H04L 63/1425 (2013.01); G06F 21/10 (2013.01); G06Q 10/06 (2013.01); G06Q 20/4016 (2013.01); G06Q 30/0185 (2013.01); G06F 2221/0775 (2013.01)

(58) Field of Classification Search
CPC ....... G06F 21/10; G06F 21/105; G06F 21/335
USPC .............. 726/22–25; 713/151, 171; 709/205
See application file for complete search history.

(56) References Cited

U.S. PATENT DOCUMENTS

| 7,124,305 B2 * | 10/2006 | Margolus .......... G06F 17/30097 |
| | | 707/999.01 |
| 7,774,842 B2 * | 8/2010 | Mahone ................ H04M 15/00 |
| | | 379/114.14 |

(Continued)

OTHER PUBLICATIONS

Song, et al., "Multi-Stage Malicious Click Detection on Large Scale Web Advertising Data", In Proceedings of First International Workshop on Big Dynamic Distributed Data, Aug. 30, 2013, pp. 1-6.

(Continued)

Primary Examiner — Carl Colin
Assistant Examiner — Viral Lakhia
(74) Attorney, Agent, or Firm — Merchant & Gould

(57) ABSTRACT

Aspects of an abuse detection system for a web service include an abuse detection engine executing on a server. The abuse detection engine includes a pre-processing module for aggregating a data set for processing and analysis; a suspiciousness test module for identifying suspicious content owners and suspicious users; a graphing module for finding connections between suspicious content owners and suspicious users; an analysis module for determining which groups are constituted of fraudulent or abusive accounts; and a notification generation and output module for generating a list of abusive entities and a notification for output to at least one of: the abusive entity, a digital content distribution company associated with the abusive entity, and a legal department or other entity for further investigation or action. Additionally, royalties for content consumptions associated with abusive accounts may be held. Aspects of an abusive traffic detection method enable multi-account and multi-content owner fraud detection.

20 Claims, 18 Drawing Sheets

(56) References Cited

U.S. PATENT DOCUMENTS

| | | | |
|---|---|---|---|
| 8,103,543 B1* | 1/2012 | Zwicky | G06Q 30/02 |
| | | | 705/14.26 |
| 8,135,615 B2 | 3/2012 | Bradley et al. | |
| 8,321,269 B2* | 11/2012 | Linden | G06Q 30/0257 |
| | | | 705/14.26 |
| 8,549,647 B1* | 10/2013 | Mason | G06F 21/564 |
| | | | 726/23 |
| 8,676,637 B2 | 3/2014 | Aaron et al. | |
| 8,694,374 B1 | 4/2014 | Diligenti et al. | |
| 8,826,155 B2* | 9/2014 | Dixon | G06Q 10/06 |
| | | | 715/760 |
| 8,862,524 B2* | 10/2014 | Zheng | H04L 63/1408 |
| | | | 706/12 |
| 9,129,110 B1* | 9/2015 | Mason | G06F 21/564 |
| 9,253,208 B1* | 2/2016 | Koshelev | H04L 63/1483 |
| 9,300,676 B2* | 3/2016 | Madhu | G06Q 50/265 |
| 9,336,389 B1* | 5/2016 | Okereke | G06F 21/56 |
| 9,338,143 B2* | 5/2016 | Hansen | H04L 63/102 |
| 9,578,042 B2* | 2/2017 | Hu | H04L 63/126 |
| 2007/0061211 A1 | 3/2007 | Ramer et al. | |
| 2008/0114624 A1 | 5/2008 | Kitts | |
| 2009/0288150 A1* | 11/2009 | Toomim | G06F 21/6218 |
| | | | 726/5 |
| 2010/0131353 A1 | 5/2010 | Ha et al. | |
| 2010/0235918 A1* | 9/2010 | Mizrahi | H04L 63/1416 |
| | | | 726/25 |
| 2011/0320816 A1* | 12/2011 | Yao | G06F 21/316 |
| | | | 713/171 |
| 2012/0158851 A1* | 6/2012 | Kelmenson | G06F 17/30864 |
| | | | 709/205 |
| 2012/0173315 A1 | 7/2012 | Martini et al. | |
| 2013/0117081 A1* | 5/2013 | Wilkins | G06Q 30/0248 |
| | | | 705/14.4 |
| 2013/0160087 A1* | 6/2013 | Davis | H04L 67/22 |
| | | | 726/4 |
| 2014/0068761 A1 | 3/2014 | Ragavan et al. | |
| 2014/0282872 A1* | 9/2014 | Hansen | H04L 63/102 |
| | | | 726/3 |
| 2015/0188941 A1* | 7/2015 | Boshmaf | H04L 67/306 |
| | | | 726/22 |
| 2015/0213246 A1* | 7/2015 | Turgeman | G06F 21/32 |
| | | | 726/23 |
| 2015/0288702 A1* | 10/2015 | Choe | H04L 63/102 |
| | | | 726/1 |
| 2015/0350229 A1* | 12/2015 | Mitchell | H04L 63/1425 |
| | | | 726/23 |
| 2016/0044054 A1* | 2/2016 | Stiansen | H04L 63/1416 |
| | | | 726/24 |

OTHER PUBLICATIONS

Soldo, et al., "Traffic Anomaly Detection Based on the IP Size Distribution", In Proceedings of IEEE INFOCOM, Mar. 25, 2012, pp. 1-9.

Metwally, et al., "Estimating the Number of Users behind IP Addresses for Combating Abusive Traffic", In Proceedings of 17th ACM SIGKDD International Conference on Knowledge Discovery and Data Mining, Aug. 21, 2011, 9 pages.

"Second Written Opinion Issued in PCT Application No. PCT/US2016/037298", dated May 3, 2017, 4 Pages.

"International Search Report and Written Opinion Issued in PCT Application No. PCT/US2016/037298", dated Aug. 25, 2016, 10 Page.

"Last.fm", Retrieved from <<https://en.wikipedia.org/w/index.php?title=Last.fm&oldid=665032217>>, Jun. 1, 2015, 24 Pages.

* cited by examiner

| Group 1102 | Users 1006 | Content Owners 806 | Group Suspicious Consumptions 1208 | Average User Suspicious Consumptions 1210 | Type 1212 | ID 1214 | Content Owner Name 1216 | Consumptions 1218 | Suspicious Consumptions 1220 | Links 1222 | Suspicious Links 1224 |
|---|---|---|---|---|---|---|---|---|---|---|---|
| 6 | 6 | 10 | 362326 | 60387 | Content Owner | 1123 | Dr. Kewl | 33059 | 1 | 6 | 1 |
| 6 | 6 | 10 | 362326 | 60387 | Content Owner | 5798 | Mtown | 37754 | .99 | 7 | 0.85 |
| 6 | 6 | 10 | 362326 | 60387 | Content Owner | 2786 | Prana | 31941 | 1 | 6 | 1 |
| 6 | 6 | 10 | 362326 | 60387 | Content Owner | 3246 | Eme | 34925 | 1 | 6 | 1 |
| 6 | 6 | 10 | 362326 | 60387 | Content Owner | 5783 | Chunk | 33032 | 1 | 6 | 1 |
| 6 | 6 | 10 | 362326 | 60387 | Content Owner | 9852 | MadPup | 52591 | .99 | 21 | 0.28 |
| 6 | 6 | 10 | 362326 | 60387 | Content Owner | 4526 | GMonee | 38458 | 1 | 6 | 1 |
| 6 | 6 | 10 | 362326 | 60387 | Content Owner | 8520 | Jbone | 43813 | .99 | 11 | 0.54 |
| 6 | 6 | 10 | 362326 | 60387 | Content Owner | 5412 | Bchan | 54712 | .99 | 9 | 0.66 |
| 6 | 6 | 10 | 362326 | 60387 | Content Owner | 1234 | Soqie | 3024 | .68 | 362 | 0 |
| 6 | 6 | 10 | 362326 | 60387 | User | 9876 | Dr. Kewl \| Mtown \| Prana \| Eme \| Chunk \| MadPup \| Gmonee \| Jbone \| Bchan | 50499 | .99 | 11 | 0.81 |
| 6 | 6 | 10 | 362326 | 60387 | User | 3246 | Dr. Kewl \| Mtown \| Prana \| Eme \| Chunk \| MadPup \| Gmonee \| Jbone \| Bchan | 42408 | .99 | 10 | 0.9 |
| 6 | 6 | 10 | 362326 | 60387 | User | 6547 | Dr. Kewl \| Mtown \| Prana \| Eme \| Chunk \| MadPup \| Gmonee \| Jbone \| Bchan | 39517 | .98 | 10 | 0.9 |
| 6 | 6 | 10 | 362326 | 60387 | User | 2165 | Dr. Kewl \| Mtown \| Prana \| Eme \| Chunk \| MadPup \| Gmonee \| Jbone \| Bchan | 79157 | .99 | 11 | 0.9 |
| 6 | 6 | 10 | 362326 | 60387 | User | 8569 | Dr. Kewl \| Mtown \| Prana \| Eme \| Chunk \| MadPup \| Gmonee \| Jbone \| Bchan Soqie | 78630 | .99 | 11 | 0.9 |
| 6 | 6 | 10 | 362326 | 60387 | User | 1254 | Dr. Kewl \| Mtown \| Prana \| Eme \| Chunk \| MadPup \| Gmonee \| Jbone \| Bchan Soqie | 76006 | .96 | 17 | 0.58 |

Table 1200 — 1202 1204

FIG. 12

ABUSIVE TRAFFIC DETECTION

BACKGROUND

A web-based digital content service, such as a web music service, provides users with on-demand digital content, such as music, which they can stream and/or download to a client device. Content owners, such as independent musicians or recording artists are able to upload content to the content service, for example, via a do-it-yourself company label or a digital content distribution company, and sell content (e.g., music) via the service by collecting royalties on content that is consumed by a user. For example, each time a user streams or downloads a song via the service, the artist or content owner of the song receives a royalty for the stream or download. The higher the volume of consumption (e.g., number of streams or downloads), the more royalties the content owner receives.

One challenge with a pay-per-stream (or download) service is fraud. In some examples, fraud occurs when a content owner generates fake traffic on content he/she owns to collect royalties. Such fraudulent behavior can be difficult to detect because various techniques are used to simulate behavior of a normal user.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Aspects of a system and method for detecting abusive traffic include an abuse detection engine executing on one or more servers. The abuse detection engine executing on one or more servers includes a pre-processing module, a suspiciousness test module, a graphing module, an analysis module, and a notification generation and output module. The pre-processing module is operable to aggregate a data set for processing and analysis; the suspiciousness test module is operable to identify suspicious content owners and suspicious users; the graphing module is operable to find connections between suspicious content owners and suspicious users; the analysis module is operable to determine which groups are constituted of fraudulent or abusive accounts; and the notification generation and output module are operable to generate a list of groupings of abusive entities, and generate a notification for output to at least one of: the abusive entity, a company label associated with the abusive entity, and a legal department or other entity for further investigation or action. Aspects of the abusive traffic detection system and method enable multi-account and multi-content owner fraud detection that is optimized for distributed computation over large data sets.

As can be appreciated, abusive traffic on a web service can increase network bandwidth usage and slow down performance of the server. By detecting fraudulent traffic by abusive entities, actions may be taken by the web service to stop or deter the fraudulent traffic, thus reducing network bandwidth usage. Accordingly, the server processor load may be reduced, thus improving streaming performance of the web service. Additionally, abusive traffic on a web service for fraudulently collecting royalties hurts the web service and legitimate content owners. In some examples, the abusive traffic detection system is operable to hold payment of royalties to accounts that are determined to be part of an abusive entity. Without the automated near-real-time detection of abusive traffic provided by aspects, payment to abusive and fraudulent accounts may already be done by the time the fraud is detected (if it is ever detected). Utilization of the abuse detection engine for a web service improves the web service's ability to pay legitimate content owners for rightful traffic.

Examples are implemented as a computer process, a computing system, or as an article of manufacture such as a computer program product or computer readable media. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views:

FIG. 12 is an illustration of an example table including output generated by the analysis module;

DETAILED DESCRIPTION

Various aspects are described more fully below with reference to the accompanying drawings, which form a part hereof, and which show specific exemplary aspects. However, aspects may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Systems and methods for detecting abusive traffic on a content service are described herein and illustrated in the accompanying figures. Although examples are described in a context of a web-based digital content service, the abusive traffic detection method and system are not meant to be limited to web-based digital content services. Aspects of the abusive traffic detection method and system may be implemented in other contexts, for example, on websites or content provider systems that employ payment of royalties based on a traffic volume or per-consumption of content. Aspects of the abusive traffic detection method and system are optimized for distributed computation over large data sets, and are operable to detect abusive traffic without accessing content users' and content owners' personal information (e.g., name, address, credit card number, etc.).

Figure 1A:
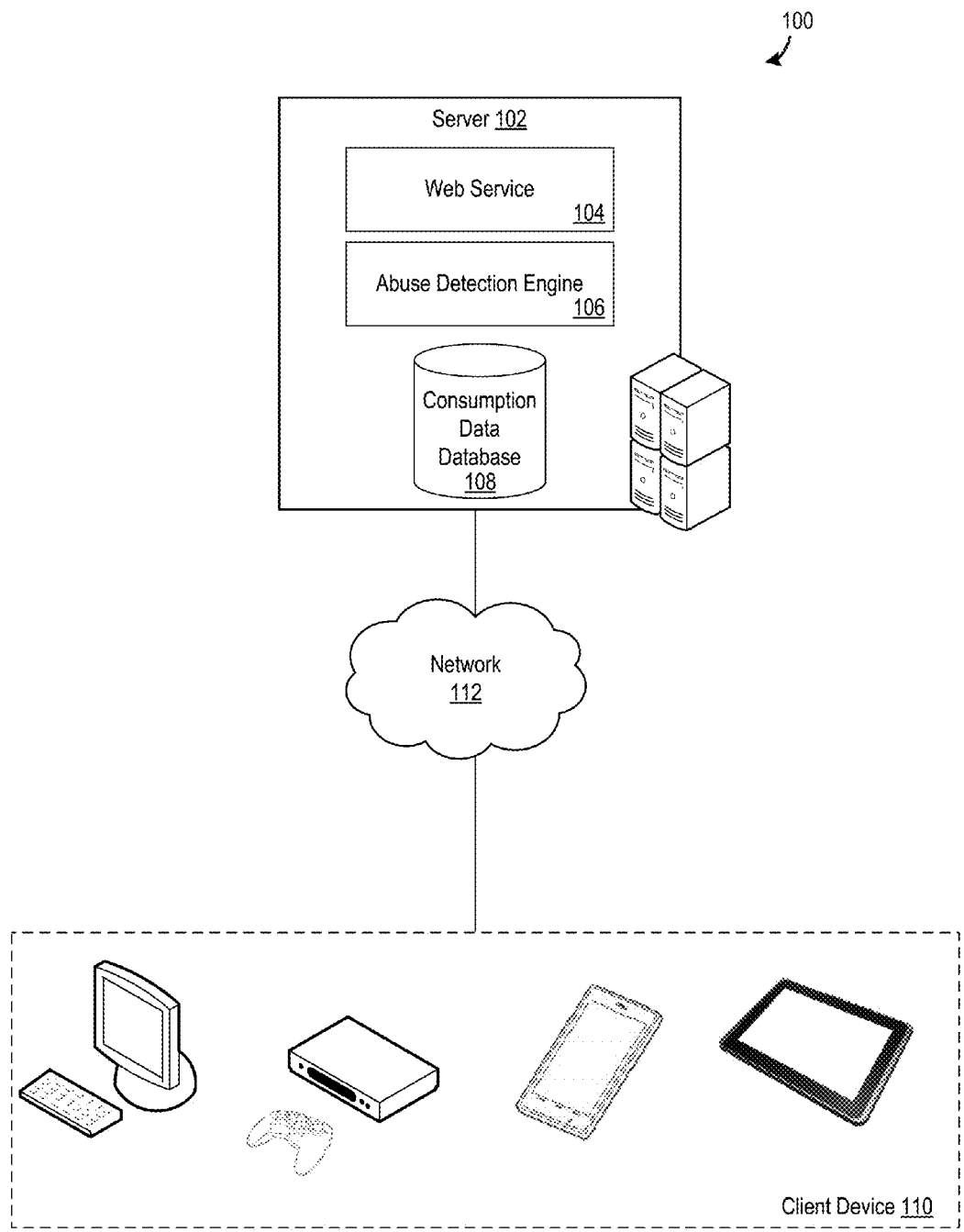
FIG. 1A is a simplified block diagram of an example abusive traffic detection system.
Figure 1B:
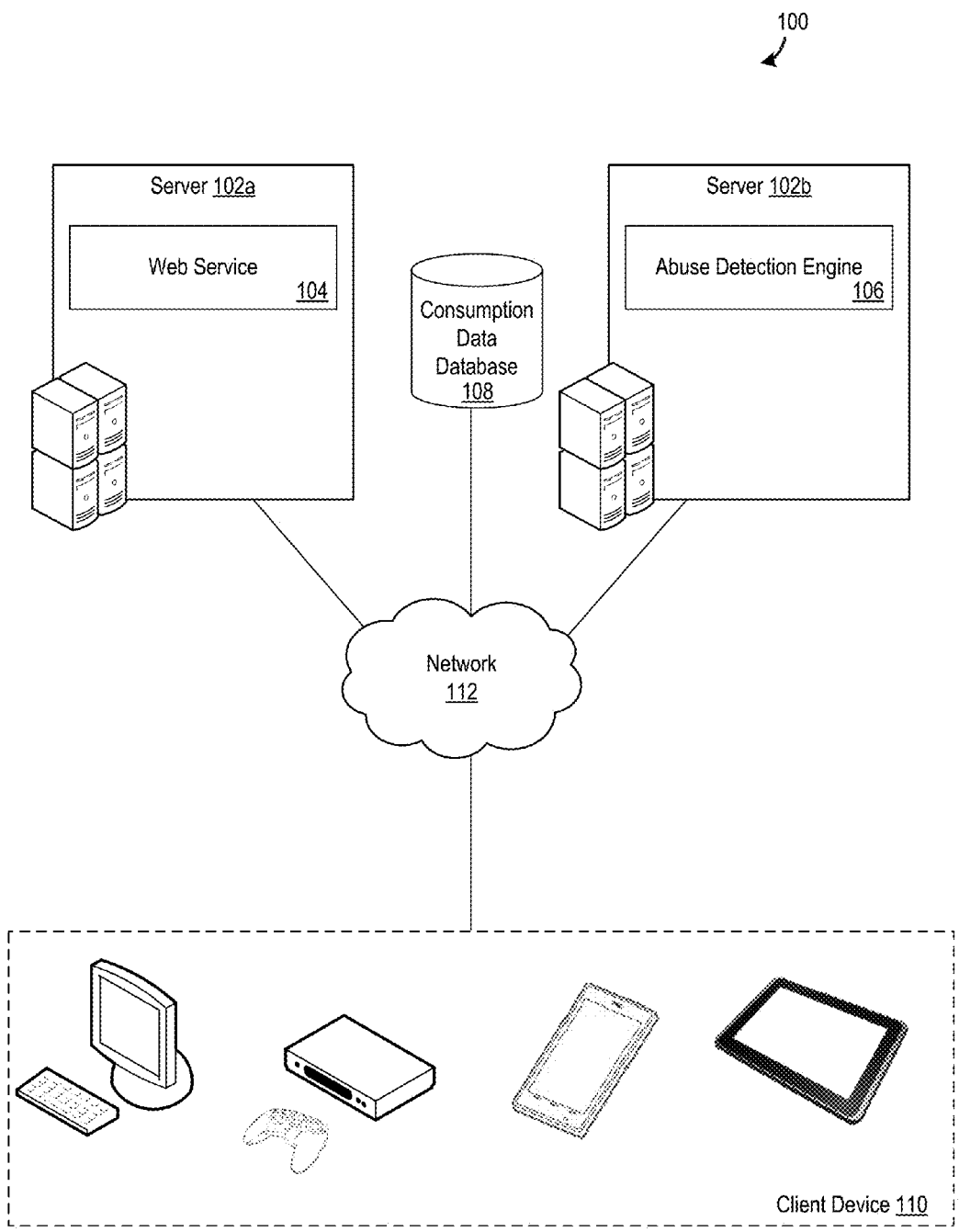
FIG. 1B is a simplified block diagram of an example distributed abusive traffic detection system.

FIGS. 1A and 1B are a block diagram of examples of an abuse detection system. In some examples and as illustrated in FIG. 1A, various components of an abuse detection system 100, for example, a web service 104 (e.g., a web-based music service, video service, digital book service, etc.), a database 108 comprising consumption data of content provided via the web service 104, and an abuse detection engine 106, are operated on a single server 102. In other examples and as illustrated in FIG. 1B, the various components of the abuse detection system 100 operate on a plurality of servers. For example, the web service 104 may operate on a first server 102a, the abuse detection engine 106 may operate on a second server 102b, and the consumption data of content provided via the web service 104 may be stored in a remote database 108.

While the server(s) 102,102a,102b are illustrated as a single box, it should be understood that the server(s) are scalable and may include a plurality of servers in communication. For example, the web service 104 may operate on a plurality of servers. As another example, functionality, memory, data storage and retrieval, and various components and processing functions of the abuse detection engine 106 are operated remotely from each other on a plurality of servers in communication over a network (e.g., the Internet or an intranet). The abuse detection engine 106 will be described in detail with respect to FIGS. 6-12. The abuse detection system 100 further includes a client device 110. According to aspects, the various system components are configured to communicate over a distributed computing network 112, such as the Internet.

The client device 110 may be one of various types of computing devices, such as a personal computing device, a tablet computing device, a mobile computing device, a gaming device, a wearable device, a large form factor device, etc. As should be appreciated, this list is exemplary only and is not meant to be limiting. The client device 110 may include an input device (e.g., keyboards, touch screens, controllers, gesture detection devices, mice, etc.) and an output device (e.g., display screen, printer, speaker, etc.). In some examples, a user of the client device 110 uses the client device 110 to upload one or more content items, such as a music file, a video file, a digital book, or other content item to the web service 104 for distribution. In other examples, a user of the client device 110 uses the client device 110 to stream or download content items (e.g., music files, video files, digital books, etc.) for consumption.

Figure 2:
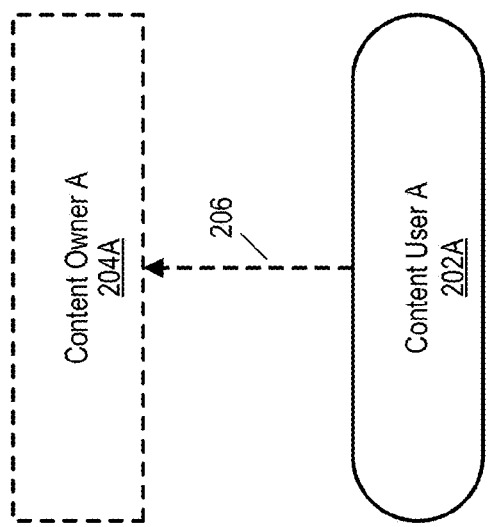
FIG. 2 is an illustration of an example of abusive traffic.

According to an aspect, some users utilize the client device 110 for consuming content in an abusive manner. Abusive users employ various techniques to attempt to bypass detection. For example and as illustrated in FIG. 2, content user A 202A consumes content owned by content owner A 204A, wherein content user A 202A and content owner A 204A are the same person. That is, user A 202A generates fake traffic 206 on the user's own content to collect royalties. Thus, content user A 202A and content owner A 204A constitute an abusive entity.

Figure 3:
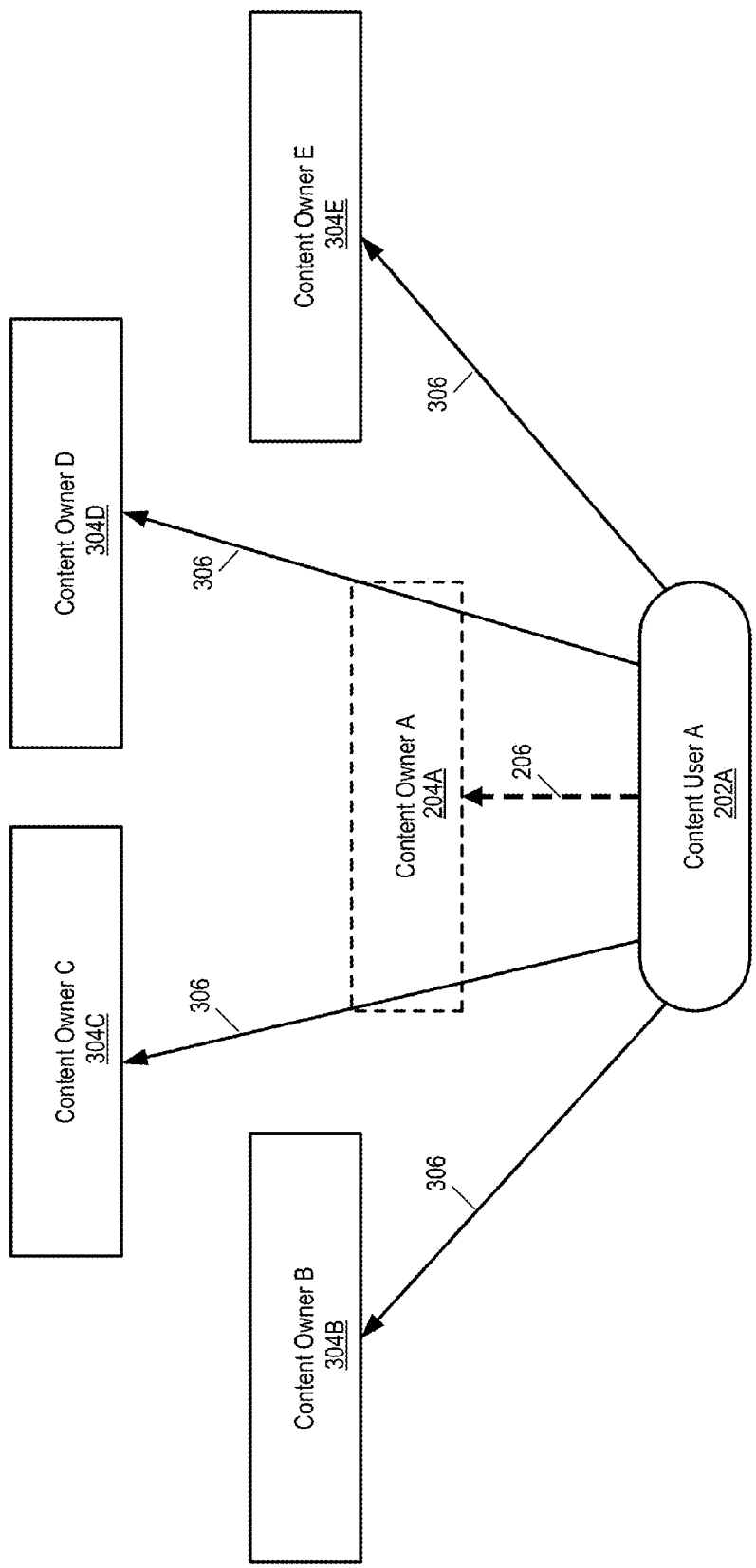
FIG. 3 is an illustration of an example of abusive traffic hidden amongst realistic traffic.

As another example and as illustrated in FIG. 3, abusive users may mix their abusive traffic (fake traffic 206) with realistic traffic to be less detectable. For example and as illustrated, abusive content user A 202A generates realistic traffic 306 on content owned by legitimate content owner B 304B, on content owned by legitimate content owner C 304C, on content owned by legitimate content owner D 304D, and on content owned by legitimate content owner E 304E while generating fake traffic 206 on content user A's own content (i.e., content owned by content owner A 204A).

Figure 4:
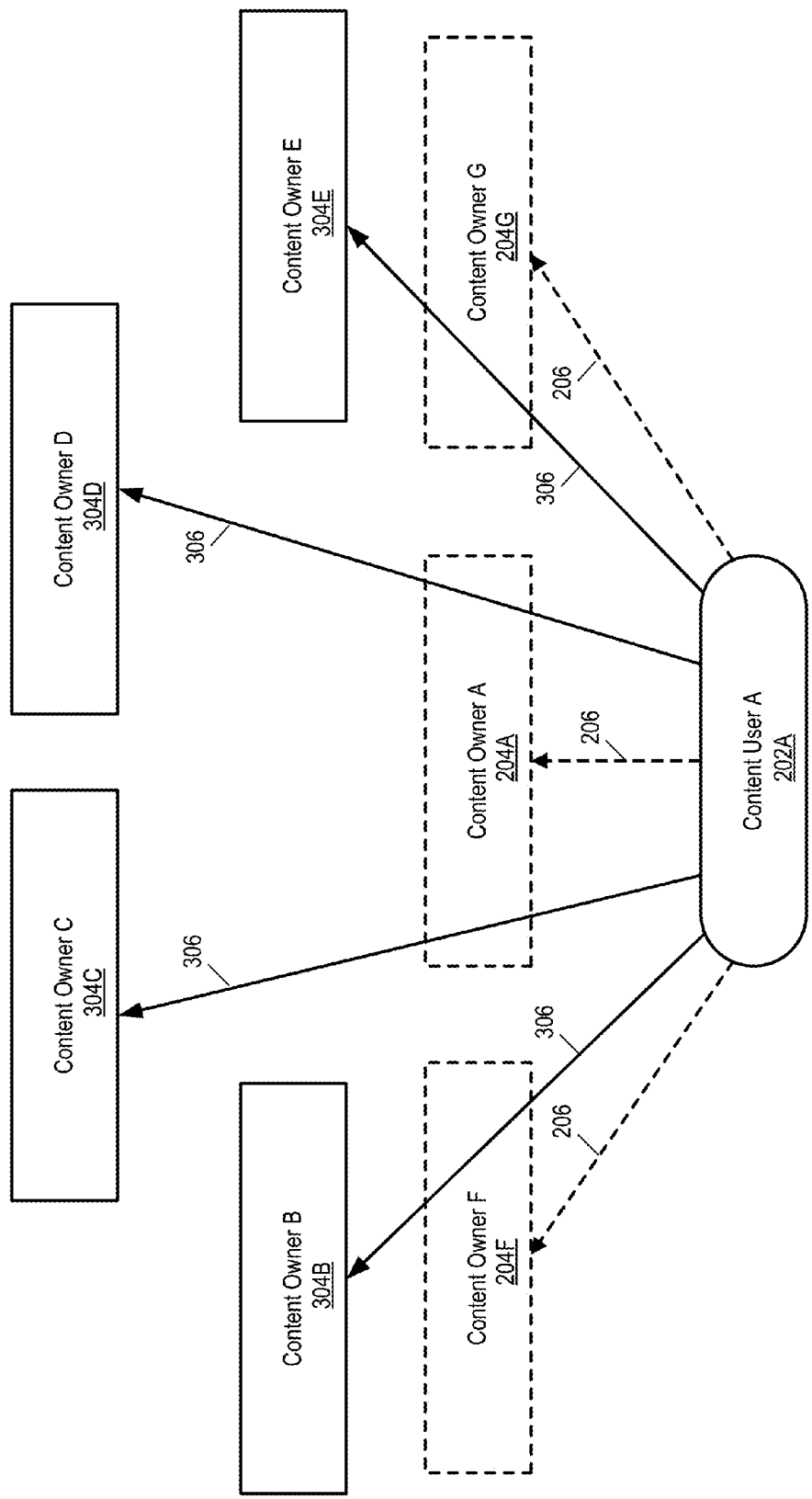
FIG. 4 is an illustration of an example of multi-content owner abusive traffic.

As another example and as illustrated in FIG. 4, abusive users may create multiple content owner names to hide their abusive traffic. For example and as illustrated, in addition to the realistic traffic 306 generated on content owned by legitimate content owners 304B,C,D,E, abusive content user A 202A creates other content owner names/accounts: content owner F 204F and content owner G 204G, and generates fake traffic 206 on content associated with content owner F 204F and content owner G 204G in addition to content associated with content owner A 204A. Thus, content user A 202A, content owner A 204A, content owner F 204F, and content owner G 204G constitute an abusive entity. This is an example of multi-content owner abusive traffic.

Figure 5:
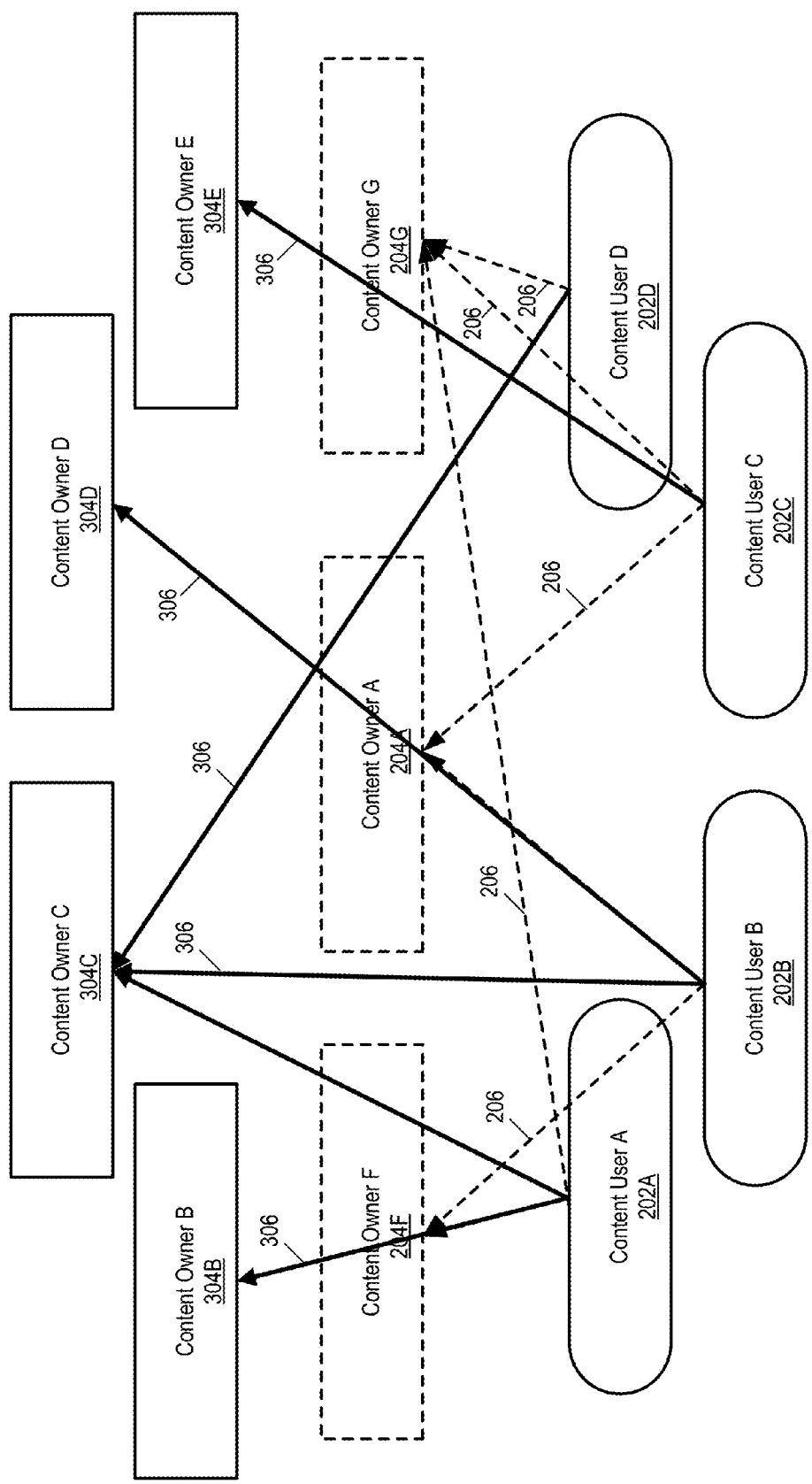
FIG. 5 is an illustration of an example of multi-content owner and multi-account abusive traffic.

As another example and as illustrated in FIG. 5, abusive users may create multiple user accounts to further hide their abusive traffic. For example, and as illustrated, abusive content user A 202A creates multiple user names/accounts: content user B 202B, content user C 202C, and content user D 202D, and generates fake traffic 206 from the created accounts 202A,B,C,D on content owned by content owners A,F, and G 204A,F,G (the abusive user's own content) and realistic traffic 306 on content owned by legitimate content owners B,C,D, and E 304B,C,D,E. Thus, content user A 202A, content user B 202B, content user C 202C, content user D 202D, content owner A 204A, content owner F 204F, and content owner G 204G constitute an abusive entity. This is an example of multi-account, multi-content owner abusive traffic.

Figure 6:
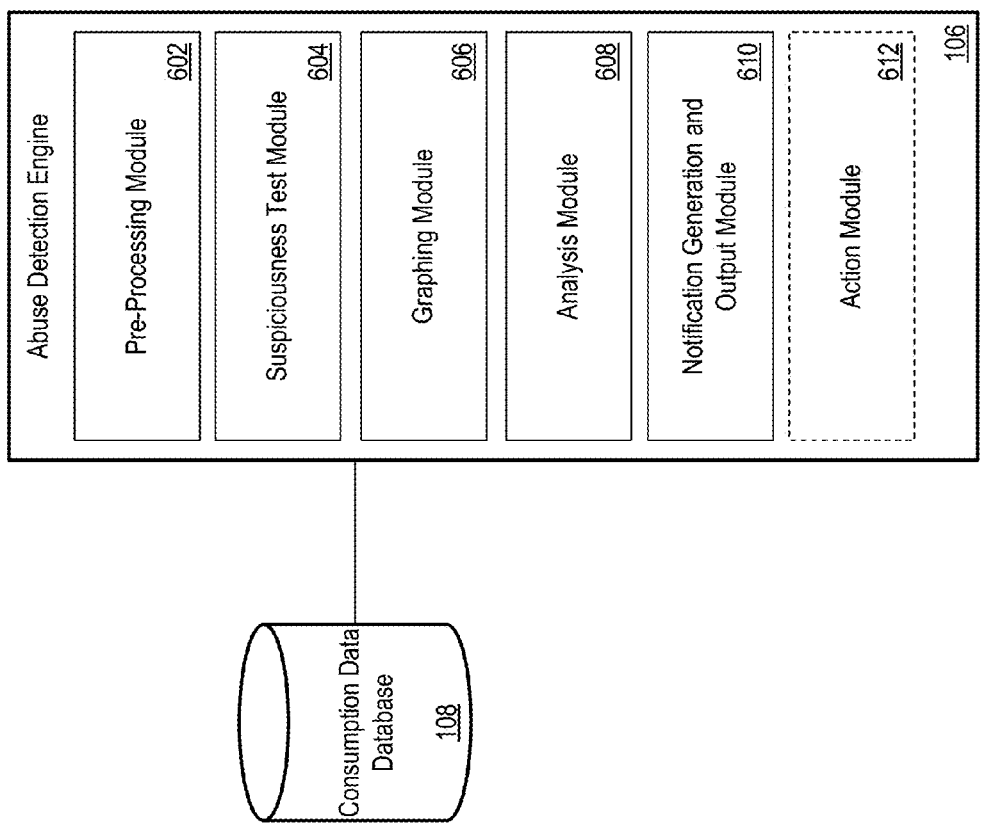
FIG. 6 is a simplified block diagram showing components of the abuse detection engine.
Figure 7:
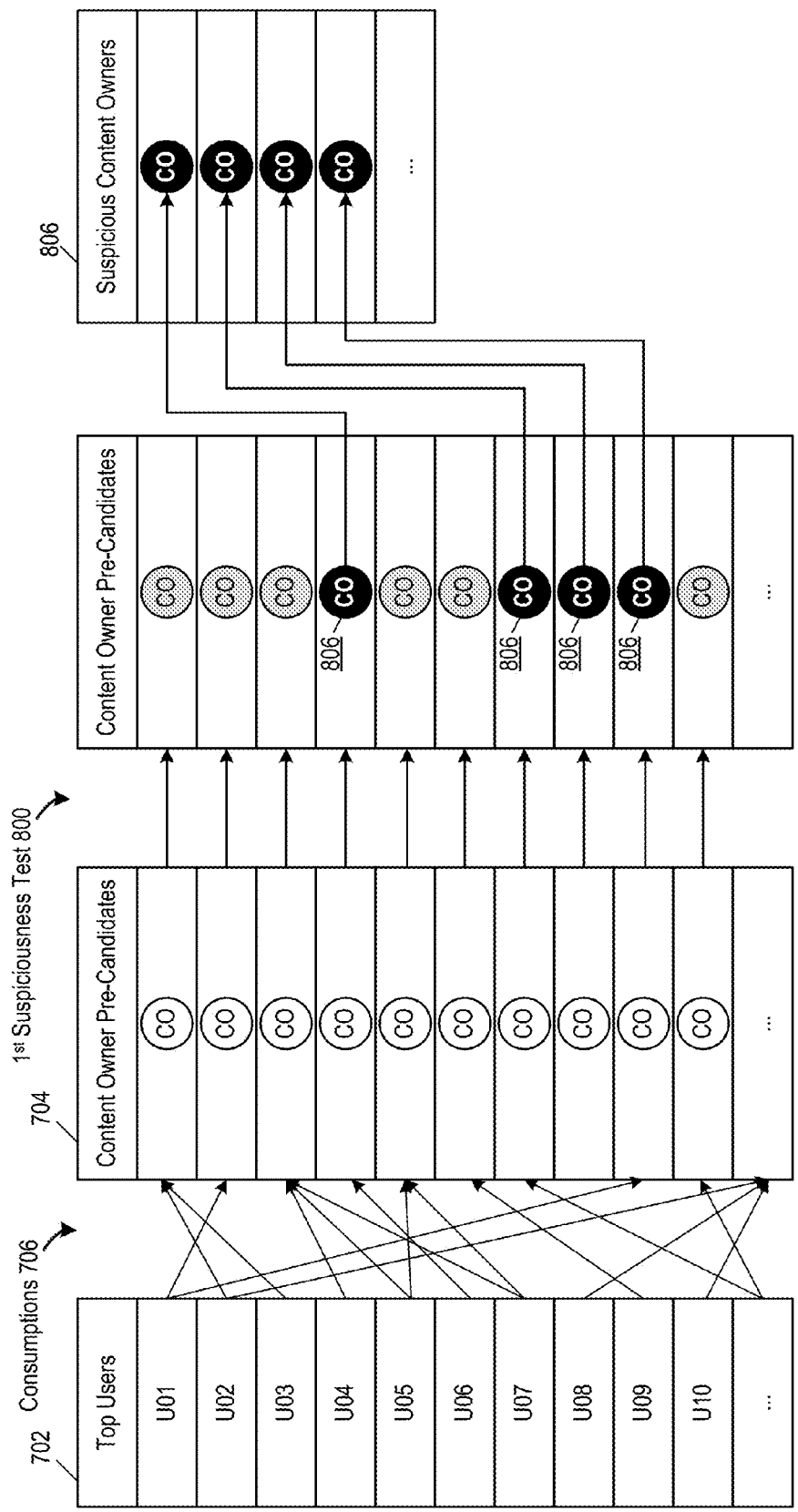
FIG. 7 is an illustration of stages involved in identifying suspicious content owners.

With reference now to FIG. 6, a simplified block diagram illustrating various components of the abuse detection engine 106 is shown. According to an aspect, the abuse detection engine 106 comprises a pre-processing module 602, a suspiciousness test module 604, a graphing module 606, an analysis module 608, and a notification generation and output module 610. The pre-processing module 602 is operable to gather consumption data from the consumption data database 108, and aggregate a data set for processing and analysis. According to an example, the consumption data database 108 may store tens of millions of data lines associated with hundreds of thousands to millions of users. The pre-processing module 602 gathers consumption facts from the large amount of consumption data, for example, a content user consuming a content item owned by a content owner, a date of the consumption, and, in some examples, a company label associated with the content. According to examples, the pre-processing module 602 does not collect personal information associated with content users or content owners (e.g., name, address, credit card information, etc.). According to an aspect, consumption includes streaming, where a user consumes content online and metering, where a user downloads content onto a client device 110 and consumes the content off-line. According to an example, the pre-processing module 602 gathers consumption facts associated with consumption of content within a certain time frame (e.g., within the last 30 days).

The suspiciousness test module 604 includes functionality for identifying suspicious content owners and suspicious users. According to an aspect and with reference to FIG. 7, the suspiciousness test module 604 is operable to perform a plurality of processing steps for identifying suspicious content owners. A first step includes identifying a list of top users 702. In some examples, the top users 702 include users who trigger more royalties than the cost of the user's user account. This example is applicable with a web service 104 where the user account is subscription-based, for example, the user pays a monthly subscription amount, which allows the user to consume an unlimited amount of content within a subscription period, and royalties are paid to content owners who own content consumed by content users. In other examples, the top users 702 include most-active users (i.e., the users who consume the most content during a time period). In this example, the most-active users selected for inclusion in the list of top users 702 may include the users consuming an amount of content over a predetermined threshold, may include a top predetermined number of most-active users, may include a top predetermined percentage of most-active users, or may include a top number of most-active users until a substantial gap in consumption amount is identified.

Figure 8:
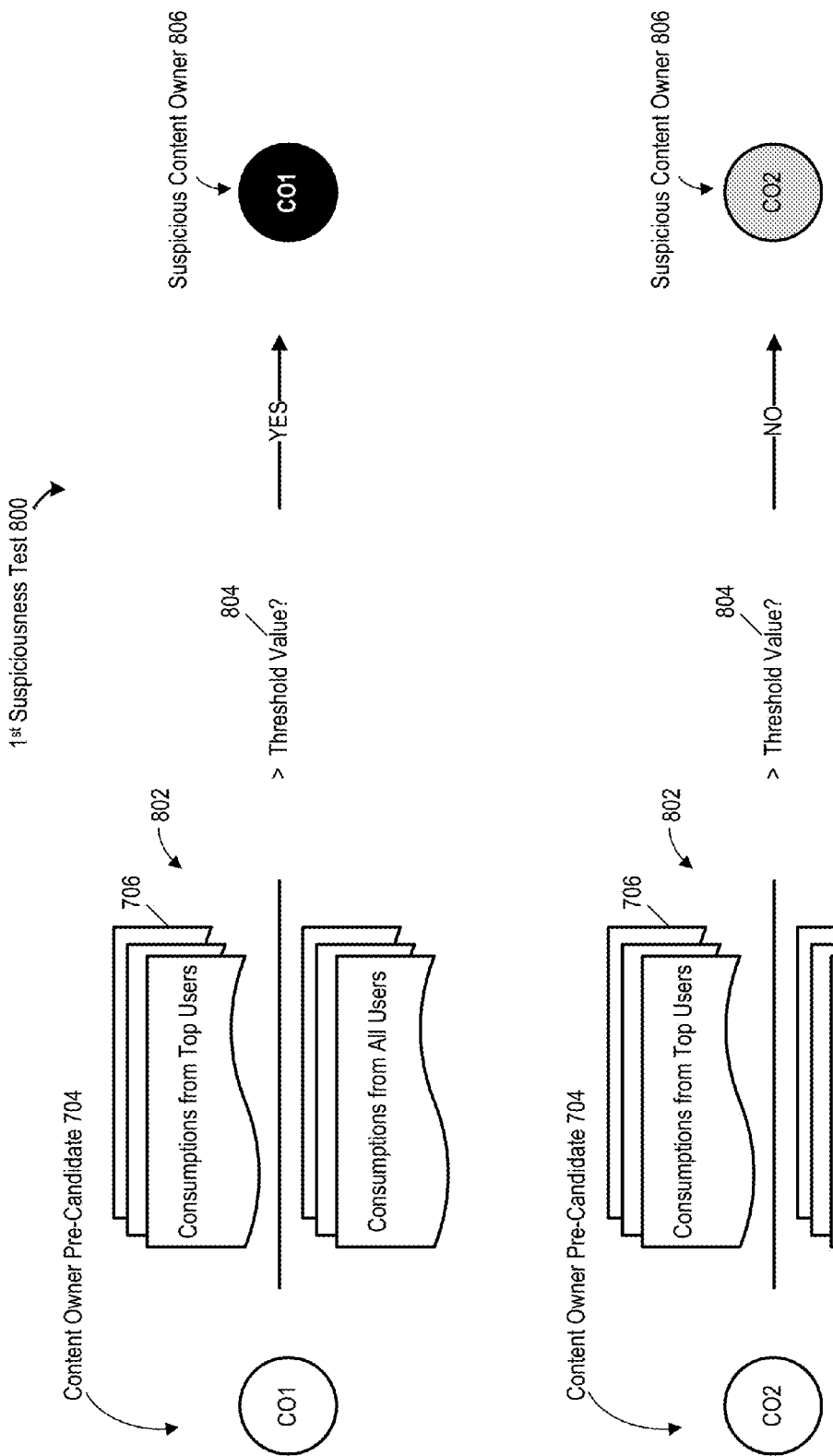
FIG. 8 is an illustration of a first suspiciousness test.
Figure 9:
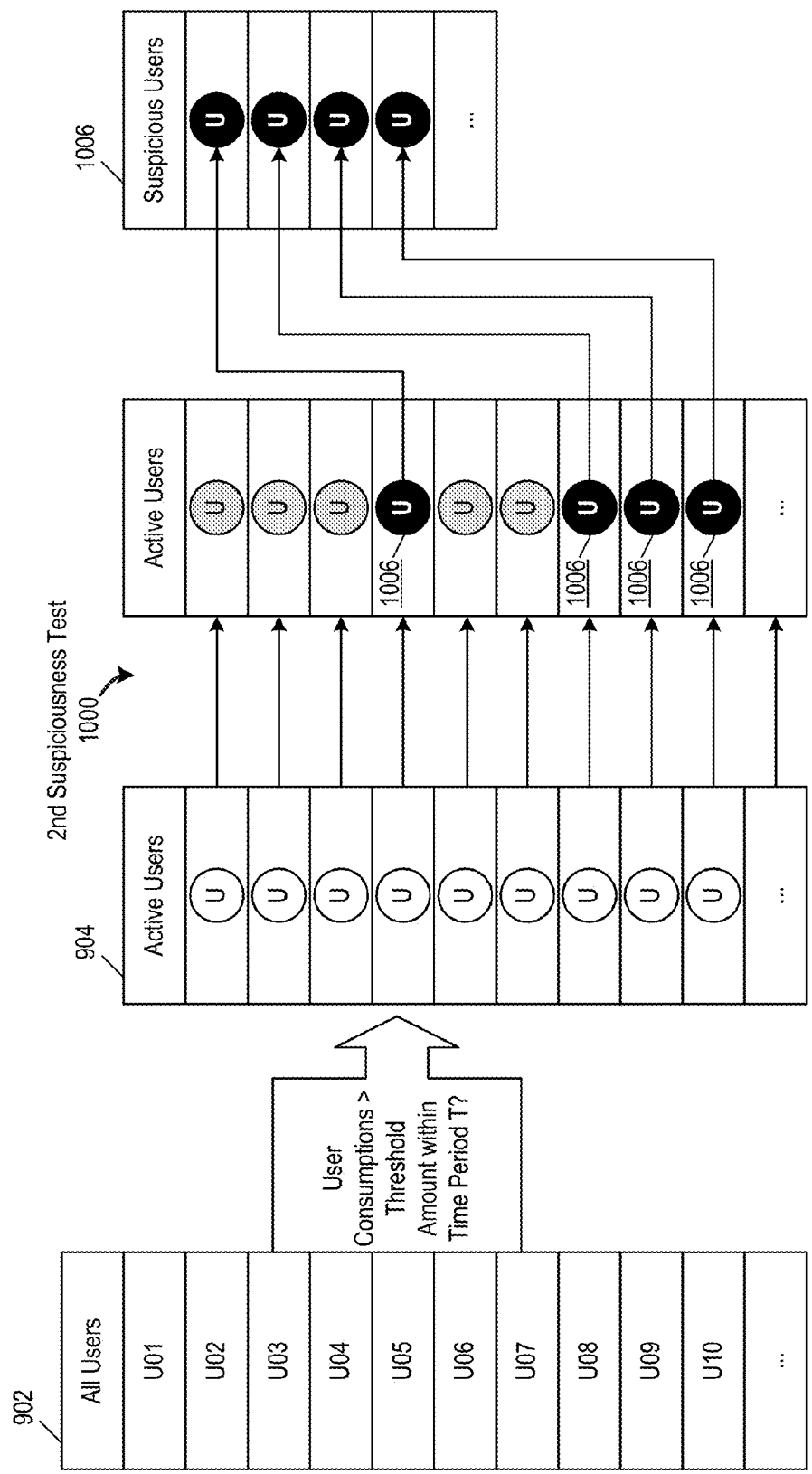
FIG. 9 is an illustration of stages involved in identifying suspicious users.

A second step for identifying suspicious content owners includes identifying content owners of content consumed by the identified top users 702. These content owners are referred to as content owner pre-candidates 704. The suspiciousness test module 604 generates a list of the identified content owner pre-candidates 704. A third step includes performing a first suspiciousness test 800 for each of the identified content owner pre-candidates 704 in the list. An example illustration of the first suspiciousness test 800 is illustrated in FIG. 8. For each identified content owner pre-candidate 704, the suspiciousness test module 604 computes the following ratio 802:

$$R = \frac{C_{TU}}{C_U}$$

where:

$C_{TU}$ is the number of consumptions 706 from the identified top users 702 on content owned by the content owner pre-candidate 704; and $C_U$ is the number of consumptions 706 from all users on content owned by the content owner pre-candidate 704.

If the ratio (R) 802 is greater than a threshold value 804, the content owner pre-candidate 704 is determined to be a suspicious content owner 806. If the ratio (R) is less than the threshold value 804, the content owner pre-candidate 704 is determined not to be a suspicious content owner 806. That is, many users consume content owned by the content owner pre-candidate 704. In some examples, the threshold value 804 is 0.5 or 50%. In other examples, a determination is made as to whether the ratio (R) is close to a threshold value 804 of 1. If the value of the ratio (R) is near 1, the content owner pre-candidate 704 is determined to be a suspicious content owner 806. As should be appreciated, the threshold value 804 is configurable, and is not limited to the above examples.

With reference back to FIG. 7, the suspiciousness test module 604 removes the content owner pre-candidates 704 determined not to be suspicious by the first suspiciousness test from the list, and generates a list of suspicious content owners 806. In some examples, traffic on content owned by a suspicious content owners 806 may be generated by a software application downloaded onto an abusive user's or other user's client device 110 that is configured to continually consume the suspicious content owner's content.

As mentioned above, the suspiciousness test module 604 includes functionality for identifying suspicious content owners 806 and suspicious users. According to an aspect and with reference to FIG. 9, the suspiciousness test module 604 is operable to perform a plurality of processing steps for identifying suspicious content users. A first step includes generating a list of active users 904 from a list of all users 902. In some examples an active user 904 is determined to be a user who has consumed content within a pre-determined time period, for example, within the last 30 days. In some examples, the suspiciousness test module 604 filters out users who have consumed less content than a predetermined consumption threshold, for example, 2,000 plays.

Figure 10:
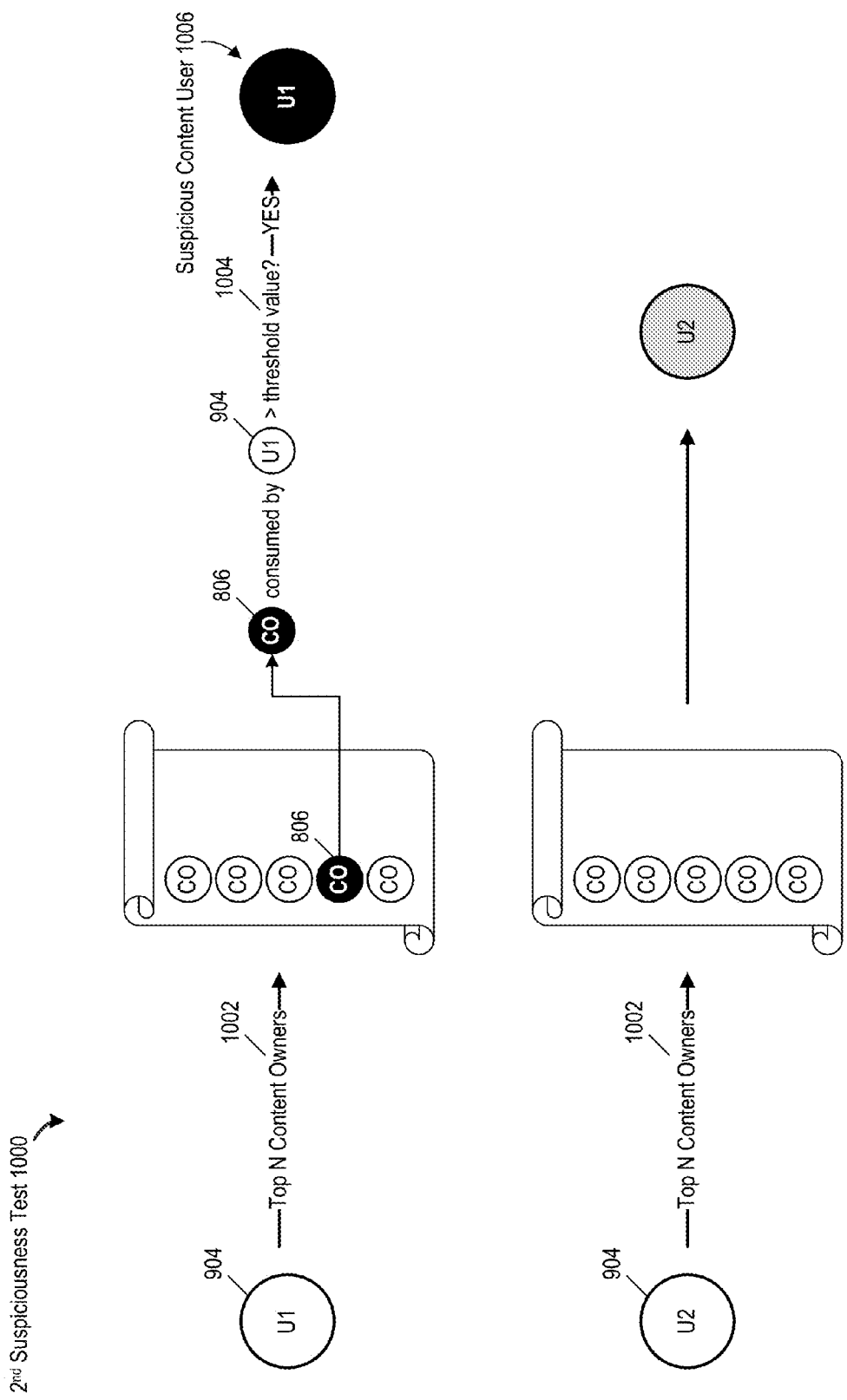
FIG. 10 is an illustration of a second suspiciousness test.

A second step for identifying suspicious users includes performing a second suspiciousness test 1000 for each of the identified active users 904. An example illustration of the second suspiciousness test 1000 is illustrated in FIG. 10. For each of the identified active users 904, the suspiciousness test module 604 identifies a pre-determined number (n) of top content owners 1002 of the active user 904, and generates a list of the top n content owners 1002 for each active user 904. According to examples, a top content owner 1002 is a content owner of content of which the active user 904 consumes a lot. Next, the suspiciousness test module 604 determines whether a suspicious content owner 806 is included in the list of top content owners 1002 for each active user 904. According to an aspect, an active user 904 is determined not to be a suspicious user when a suspicious content owner 806 is not included in the user's list of top content owners 1002. If a suspicious content owner 806 is included in an active user's 904 list of top content owners 1002, the suspiciousness test module 604 analyzes the active user's consumption of content owned by the suspicious content owner 806. According to an example, the analysis of the active user's consumption of content owned by the suspicious content owner 806 is performed to filter out users who may have consumed suspicious content by mistake or curiosity.

If the active user 904 consumes content owned by the suspicious content owner 806 more than a pre-determined threshold value 1004, the active user 904 is determined to be a suspicious user 1006. With reference back to FIG. 9, the suspiciousness test module 604 removes the active users 904 determined not to be suspicious by the second suspiciousness test from the list, and generates a list of suspicious users 1006. The output of the suspiciousness test module 604 is a list of suspicious content owners 806 and a list of suspicious content users 1006.

With reference back to FIG. 6, the abuse detection engine 106 comprises a graphing module 606, which includes functionality for finding connections between suspicious content owners 806 and the suspicious content users 1006. According to examples, the graphing module 606 models traffic between accounts of suspicious content users 1006 and suspicious content owners 806 by an undirected graph 1100, such as the example graph 1100 illustrated in FIG. 11. As is known in the art, a graph is defined by its nodes and edges. According to examples, in the graph 1100, suspicious content users 1006 and suspicious content owners 806 are represented by graph nodes, and graph edges 1104 connecting suspicious content users 1006 to suspicious content owners 806 are defined by a "suspicious content user 1006 has suspiciously consumed content from suspicious content owner 806' relationship, wherein the "suspiciously consumed content from" relationship is defined by the second suspiciousness test 1000 described with respect to FIG. 10. According to an aspect, the graphing module 606 uses graph search algorithms to determine connected components (i.e., suspicious content users 1006 and suspicious content owners 806) and to generate one or more groups 1102 of similar suspicious users 1006 and suspicious content owners 806. For example, a group 1102 comprised of one or more suspicious content user 1006 nodes and one or more suspicious content owner 806 nodes connected by "suspiciously consumed content from" relationship edges constitute are suspected to be a same entity. That is the one or more suspicious content users 1006 and suspicious content owners 806 in a group 1102 are a potential abusive entity. According to an aspect, by modeling traffic between accounts of suspicious content users 1006 and suspicious content owners 806 by a graph 1100 using graph theory, the graphing module 606 is able to detect potential fraudulent accounts, potential multi-content owner fraud, and possible multi-user account fraud.

With reference back to FIG. 6, the analysis module 608 includes functionality for determining which groups 1102 generated by the graphing module 606 are constituted of one or more fraudulent accounts. According to examples, the analysis module 608 measures the volume of traffic generated by each group 1102, and uses various metrics to determine which groups 1102 include abusive content users and content owners. In some examples, the analysis module 608 uses such data as the number of suspicious users 1006 and suspicious content owners 806 in a group 1102, the volume of abusive traffic generated by the group 1102, the number of consumptions of content owned by a suspicious content owner 806 by all users 902, the number of consumptions by a suspicious user 1006 of content owned by all content owners; the number of users of a suspicious content owner 806, and a number of content owners who own content consumed by a suspicious user 1006 to determine which groups 1102 include abusive users. An illustration of an example table 1200 including output generated by the analysis module 608 is shown in FIG. 12. The example table includes data associated with a group 1102, in this example, Group 6.

The first column 1202, titled "Group," includes a group number, which is an identification number of the group 1102.

The second column 1204, titled "Users," includes a number of suspicious users 1006 in the group 1102. In the illustrated example, Group 6 includes 6 suspicious users 1006.

The third column 1206, titled "Content Owners," includes a number of suspicious content owners 806. In the illustrated example, Group 6 includes 10 suspicious content owners 806.

The fourth column 1208, titled "Group Suspicious Consumptions," includes the size of abusive traffic generated by the group 1102. In the illustrated example, the number of abusive consumptions generated by Group 6 is 362,326.

The fifth column 1210, titled "Average User Suspicious Consumptions," includes an average amount of abusive traffic per suspicious user 1006 of the group 1102. In the illustrated example, the average number of abusive consumptions generated by the suspicious users 1006 of Group 6 is 60,387.

The sixth column 1212, titled "Type," includes an identification of whether the account is a content user account or a content owner account.

The seventh column 1214, titled "ID," includes an identification number that identifies the suspicious content user 1006 or suspicious content owner 806.

The eighth column 1216 is titled "Content Owner Name." When the account type is a content owner account, for example, in rows 1-10, the information in the eighth column includes the name of the suspicious content owner 806. When the account type is a content user account, for example, in rows 11-16, the information in the "Content Owner Name" column includes the name of the content owners (including the suspicious content owners 806) of the content consumed by the suspicious content user 1006.

The ninth column 1218 is titled "Consumptions." When the account type is a content owner account, for example, in rows 1-10, the information in the "Consumptions" column includes the number of consumptions of content owned by the suspicious content owner 806 that have been consumed by any content user 902 (suspicious and non-suspicious content users). When the account type is a content user account, for example, in rows 11-16, the information in the "Consumptions" column includes the number of times the suspicious content user 1006 has consumed content owned by any content owner (suspicious content owners and non-suspicious content owners).

The tenth column 1220 is titled "Suspicious Consumptions." When the account type is a content owner account, for example, in rows 1-10, the information in the "Suspicious Consumptions" column includes the percentage of consumptions from suspicious content users 1006. When the account type is a user account, for example, in rows 11-16, the information in the "Suspicious Consumptions" column includes the percentage of consumptions of content owned by suspicious content owners 806. A high percentage is indicative that the suspicious content user 1006 or suspicious content owner 806 is an abusive entity with a high confidence. In the example table, every suspicious account in the group 1102 has a high confidence of abuse with the exception of the suspicious content owner "Soqie" in the tenth row.

The eleventh column 1222, titled "Links," includes a number of links for the suspicious content user 1006 or suspicious content owner 806. When the account type is a content owner account, for example, in rows 1-10, the information in the "Links" column includes the number of content users who have consumed content owned by the suspicious content owner 806. When the account type is a content user account, for example, in rows 11-16, the information in the "Links" column includes the number of content owners whose content has been consumed by the suspicious user 1006.

The twelfth column 1224, titled "Suspicious Links," includes a percentage of links that are suspicious for the suspicious content user 1006 or suspicious content owner 806. When the account type is a content owner account, for example, in rows 1-10, the information in the "Suspicious Links" column includes the percentage of content users of content owned by the suspicious content owner 806 that are identified as abusive entities. When the account type is a content user account, for example, in rows 11-16, the information in the "Suspicious Links" column includes the percentage of traffic between the suspicious content user 1006 and content owners that are identified as an abusive entity. A high percentage indicates that the suspicious content user 1006 or suspicious content owner 806 is identified as an abusive entity with a high confidence.

According to examples, the analysis module 608 analyzes each group 1102 for confirming that the one or more suspicious content users 1006 and suspicious content owners 806 in the group 1102 constitute an abusive entity by, for each suspicious content owner 806 in the group 1102, calculating the following percentages ($\%_A$ and $\%_B$):

$$\%_A = \frac{C_{SU}}{C_{AU}}$$

where:

$C_{SU}$ is the number of consumptions of content by suspicious content users 1006; and $C_{AU}$ is the number of consumptions of content by all content users; and $$\%_B = \frac{SU_{SO}}{AU_{SO}}$$

where:

$SU_{SO}$ is the number of suspicious content users 1006 who consumed content owned by the suspicious content owner 806; and $AU_{SO}$ is the number of any user who consumed content owned by the suspicious content owner 806.

The analysis module 608 further computes a confidence of $\%_A$ and $\%_B$ and compares the confidence to a threshold value. If the confidence of $\%_A$ and $\%_B$ are above the threshold value, the suspicious content owner 806 is determined to be an abusive entity. For example, a suspicious content owner 806 is an abusive entity when:

Confidence$_A$>Threshold$_X$ AND
Confidence$_B$>Threshold$_Y$ or ($\alpha$×Confidence$_A$)+($\beta$×Confidence$_B$)+($\gamma$×Confidence$_A$×Confidence$_B$)>Threshold$_Z$.

According to examples, the analysis module 608 analyzes each group 1102 for confirming that the one or more suspicious content users 1006 and suspicious content owners 806 in the group 1102 constitute an abusive entity by, for each suspicious content user 1006 in the group 1102, calculating the following percentages ($\%_C$ and $\%_D$):

$$\%_C = \frac{C_{SO}}{C_{AO}}$$

where:

$C_{SO}$ is the number of consumptions of content owned by suspicious content owners 806; and $C_{AO}$ is the number of consumptions of content owned by any content owners; and $$\%_D = \frac{SO_{SU}}{AO_{SU}}$$

where:

$SO_{SU}$ is the number of suspicious content owners 806 who own content consumed by the suspicious content user 1006; and $AO_{SU}$ is the number of any content owner who owns content consumed by the suspicious content user 1006.

The analysis module 608 further computes a confidence of $\%_C$ and $\%_D$ and compares the confidence to a threshold value. If the confidence of $\%_C$ and $\%_D$ are above the threshold value, the suspicious content user 1006 is determined to be an abusive entity. For example, a suspicious content user 1006 is an abusive entity when:

Confidence$_A$>Threshold$_X$ AND
Confidence$_B$>Threshold$_Y$ or ($\alpha$×Confidence$_A$)+($\beta$×Confidence$_B$)+($\gamma$×Confidence$_A$×Confidence$_B$)>Threshold$_Z$.

The table 1200 may include additional information. In some examples, the table 1200 includes a details column that includes a name of a content label or a digital content distribution company (herein referred to as the company label) associated with the suspicious content owner 806 and a percentage of content that is distributed to the web service 104 for the suspicious content owner 806 by the company label. For example, a detail of ABCcorp=100 means that all content from the suspicious content owner 806 comes from the company label ABCcorp.

In some examples, the analysis module 608 is operable to target analysis on consumption of content from specific company labels. For example, a content user only consuming content from a specific company label or consuming content mostly from a specific company label is an indicator of suspiciousness. The analysis module 608 is operable to calculate a percentage of what content consumed by a suspicious content user 1006 is from a specific company label. A high percentage on one or two company labels' content is an indicator of suspiciousness. According to an aspect, high percentages associated with consumption of content from a specific company label is taken into account in a final decision process of confirming that a suspicious content user 1006 is an abusive entity.

In other examples, in targeting analysis on consumption of content from specific company labels, the analysis module 608 is operable to analyze only consumption on content that comes from the specific company labels. For example, content may be provided by company labels ranging from very well-known and trusted distribution companies that have high standards to sign artists to other types of distribution companies whose standards are not as high and therefore are less-trusted. Accordingly, the analysis module 608 is operable to analyze consumption on content that comes from untrusted or less-trusted company labels.

According to another aspect, personal information (e.g., name, address, credit card information) of content owners and content users may be encrypted and stored in encrypted databases. According to this aspect, the analysis module 608 is operable to compare the personal information of suspicious content users 1006 and suspicious content owners 806 in a group 1102 for determining whether the suspicious content users 1006 and suspicious content owners 806 in a group 1102 are a same person, and thus an abusive entity.

Referring again to FIG. 6, the notification generation and output module 610 includes functionality for generating a list of abusive accounts and generating a notification for output to at least one of: the one or more user accounts associated with the one more content owners 806 and the one or more content users 1006 that are determined to constitute the abusive entity, the company label associated with the content owned by the one more content owners 806 that are determined to constitute the abusive entity, and a legal department or other entity for further investigation or action. In some examples, the notification is sent to a payments department to hold payment of royalties on content owner accounts that are determined to constitute an abusive entity. Without the automated near-real-time detection of abusive traffic provided by aspects, payment to abusive and fraudulent accounts may already be done by the time the fraud is detected (if it is ever detected). In some examples, the notification for output to a legal department includes a request to obtain rights for accessing personal information of the abusive entity, for example, the user's and content owner's name or credit card information for substantiating that the abusive user and abusive content owner are the same person. In other examples, the notification for output to the one or more user accounts associated with the one more content owners 806 and the one or more content users 1006 that are determined to constitute the abusive entity includes the terms of use associated with the web service 104 account. In other examples, the notification for output to the one or more user accounts associated with the one more content owners 806 and the one or more content users 1006 that are determined to constitute the abusive entity includes a warning to cease abusive traffic. In other examples, the notification includes a recommendation of an action to perform in response to detected abusive traffic. In other examples, the notification for output includes a confidence associated with an identified abusive account. In some examples, the output of the notification is dependent on the confidence level. For example, a notification may be sent to a payments department to hold payment on royalties for accounts with a higher confidence level of abuse, while a notification comprising terms of use may be sent to the one or more user accounts associated with the one more content owners 806 and the one or more content users 1006 that are determined to constitute the abusive entity for accounts with a lower confidence level of abuse.

According to an aspect, the abuse detection engine 106 includes an optional action module 612, which includes functionality for performing an action in response to detected abusive traffic. In some examples, the action includes suspending the abusive entity's account. In some examples, the action includes removing the abusive content owner's content from the web service 104. In some examples, the determination of which action to perform is dependent on the confidence level.

Figure 13:
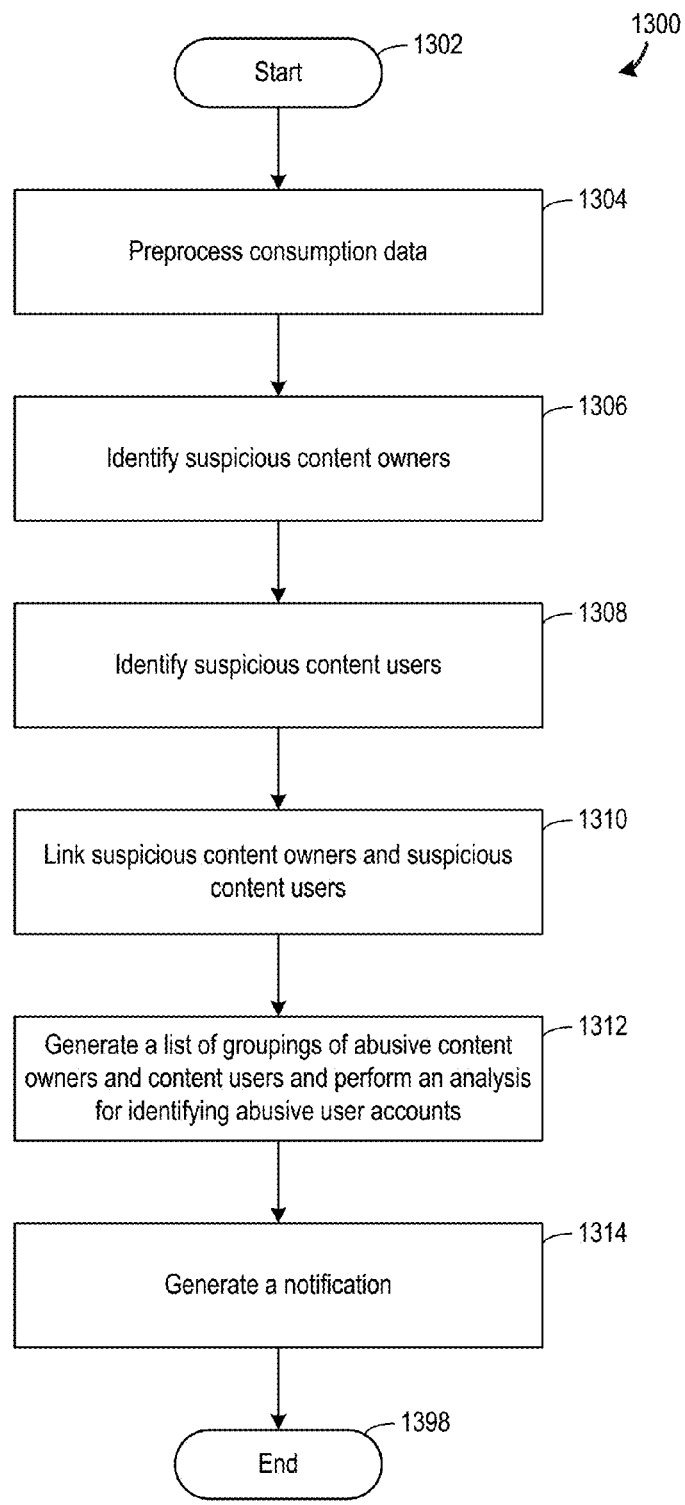
FIG. 13 is a flow chart showing general stages involved in an example method for detecting abusive traffic.

Referring now to FIG. 13, a flow chart showing general stages involved in an example method 1300 for detecting abusive traffic is shown. The method 1300 starts at OPERATION 1302, and proceeds to a pre-processing OPERATION 1304, where the pre-processing module 602 gathers consumption data from the consumption data database 108, and aggregates a data set for processing and analysis. The pre-processing module 602 aggregates a dataset of information comprising such consumption facts as a user consuming a content item owned by a content owner, the company label associated with the content item, and a date of the consumption. According to an aspect, the pre-processing module 602 gathers consumption facts associated with consumption of content with a certain time frame (e.g., within the last 30 days).

The method 1300 continues to a first test and identification OPERATION 1306, where the suspiciousness test module 604 generates a list of suspicious content owners 806. According to examples, the suspiciousness test module 604 generates a list of top users 702, analyzes the consumption facts 706 of the top users 702, and generates a list of content owners who own content that the top users 702 consume (i.e., a content owner pre-candidate 704 list). The suspiciousness test module 604 then performs a first suspiciousness test on each content owner pre-candidate 704 in the list, where for each content owner pre-candidate 704, the suspiciousness test module 604 calculates a ratio 802 of the number of consumptions 706 from the top users 702 on content owned by the content owner pre-candidate 704; and the number of consumptions 706 from all users 902 on content owned by the content owner pre-candidate 704. The suspiciousness test module 604 then makes a determination on whether the content owner pre-candidate 704 is a suspicious content owner 806 based on whether the ratio (R) 802 is greater than a threshold value 804, and generates a list of the suspicious content owners 806.

The method 1300 continues to a second test and identification OPERATION 1308, where the suspiciousness test module 604 generates a list of suspicious content users 1006. According to examples, the suspiciousness test module 604 first generates a list of active users 904 from a list of all users 902, and filters out users who have consumed less content than a predetermined consumption threshold. The suspiciousness test module 604 then performs a second suspiciousness test 1000 for each of the active users 904 in the list. The second suspiciousness test comprises identifying a pre-determined number (n) of top content owners 1002 of each active user 904, and generating a list of the top n content owners 1002 for each active user 904. Next, the suspiciousness test module 604 determines whether a suspicious content owner 806 is included in the list of top content owners 1002 for each active user 904. If a suspicious content owner 806 is included in an active user's list of top content owners 1002, the suspiciousness test module 604 analyzes the active user's consumption of content owned by the suspicious content owner 806 in the active user's 904 list of top content owners 1002. The suspiciousness test module 604 then makes a determination on whether the active user 904 is a suspicious user 1006 based on whether the active user 904 consumes more than a pre-determined threshold value 1004 of content owned by the suspicious content owner 806, and generates a list of suspicious users 1006.

Figure 11:
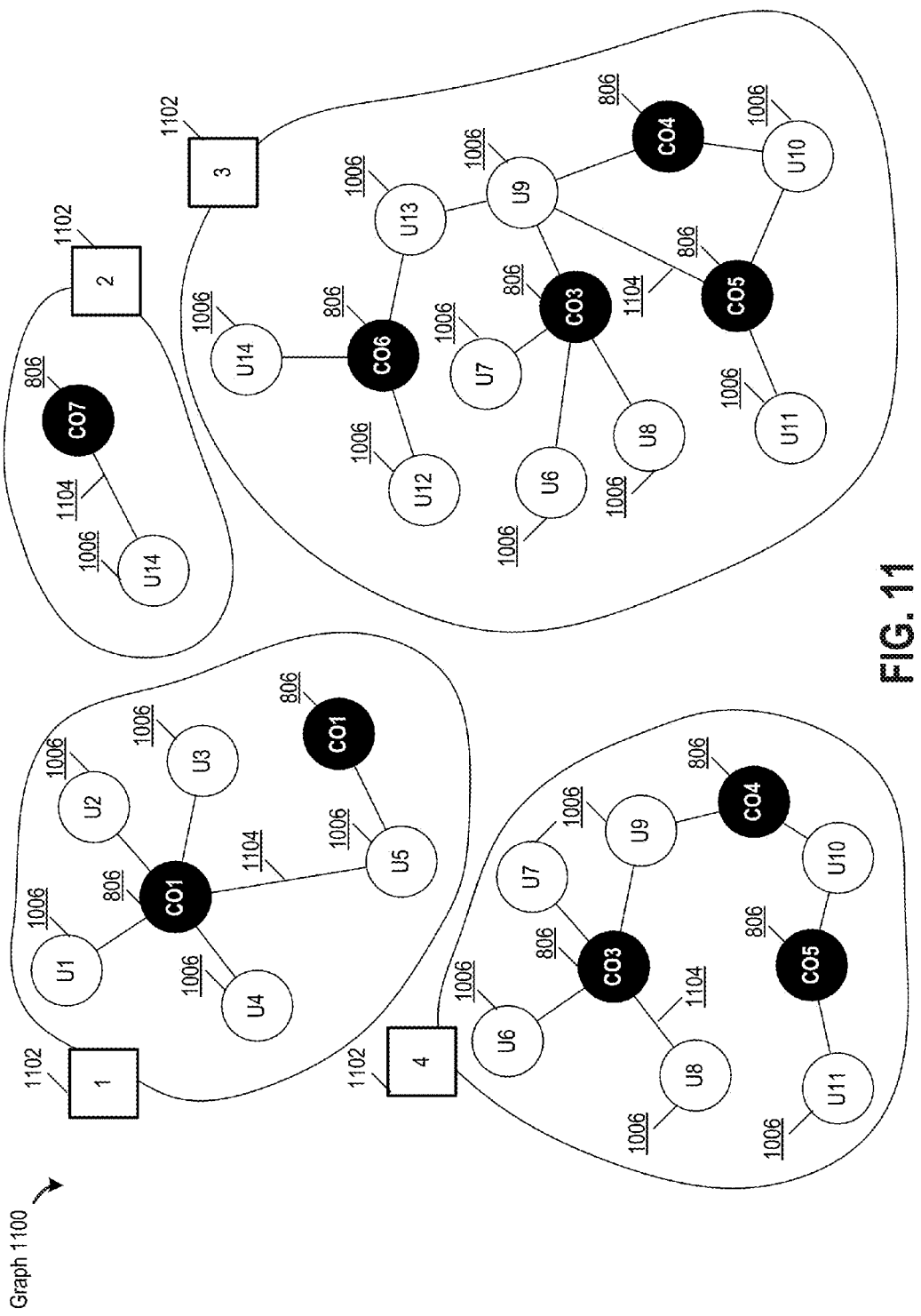
FIG. 11 is an illustration of a graph module showing traffic between suspicious users and suspicious content owners.

The method 1300 continues to a linking OPERATION 1310, where the graphing module 606 models traffic between accounts of suspicious content users 1006 and suspicious content owners 806 by an undirected graph 1100 using graph theory. As is known in the art, a graph is defined by its nodes and edges. According to examples, in the undirected graph 1100, suspicious content users 1006 and suspicious content owners 806 are represented by graph nodes, and graph edges 1104 connecting suspicious content users 1006 to suspicious content owners 806 are defined by a "suspicious content user 1006 has suspiciously consumed content from suspicious content owner 806" relationship, wherein the "suspiciously consumed content from" relationship is defined by the second suspiciousness test 1000 described with respect to FIG. 10. Using graph search algorithms, the graphing module 606 determines connected components, and identifies one or more groups 1102 of similar suspicious users 1006 and suspicious content owners 806, for example, as illustrated in FIG. 11.

The method 1300 continues to a list generation and analysis OPERATION 1312, where the analysis module 608 measures the volume of traffic generated by each group 1102, and uses various metrics to determine which groups 1102 include abusive content users. According to an example, for each suspicious content owner 806 in a group 1102, the analysis module 608 calculates a percentage of consumptions from suspicious content users 1006; and for each suspicious content user 1006 in a group 1102, the analysis module 608 calculates a percentage of consumptions of content owned by suspicious content owners 806, wherein a high percentage is indicative that the suspicious content user 1006 or suspicious content owner 806 is an abusive entity with a high confidence.

According to another example, for each suspicious content owner 806 in a group 1102, the analysis module 608 calculates a percentage of content users of the suspicious content owner's content who are identified as an abusive entity; and for each suspicious content user 1006 in a group 1102, the analysis module 608 calculates a percentage of content owners whose content is consumed by the content user that are identified as an abusive entity. A high percentage indicates that the suspicious content user 1006 or suspicious content owner 806 is identified as an abusive entity with a high confidence.

In some examples, the analysis module 608 accesses and compares the encrypted personal information of suspicious content users 1006 and suspicious content owners 806 in a group 1102 for determining whether the suspicious content users 1006 and suspicious content owners 806 in the group 1102 are a same person, and thus an abusive entity.

After completing an analysis, the analysis module 608 generates a list of groupings 1102 of abusive entities (i.e., abusive content owners and content users). The method 1300 continues to a notification OPERATION 1314, where the notification generation and output module 610 generates a notification and outputs the notification to at least one of: the accounts of the one or more content owners and content users who are determined to constitute an abusive entity, a company label associated with the abusive entity, a payments department for holding payment of royalties to the one or more content owner accounts that are determined to constitute an abusive entity, and a legal department or other entity for further investigation or action. In some examples, the method 1300 includes an action OPERATION, where the action module 612 performs an action in response to detected abusive traffic. In some examples, the action module 612 suspends the abusive entity's account. In some examples, the action module 612 removes the abusive content owner's content from the web service 104. The method 1300 ends at OPERATION 1398.

Aspects of the abuse detection method and system detect abusive traffic on a web service 104. Aspects include: aggregating a set of consumption data, the aggregated set of consumption data including a list of one or more consumption records associated with consumption of digital content via the web service 104, the one or more consumption records comprising a content owner, a content user, and a date of the consumption; identifying one or more suspicious content owners; identifying one or more suspicious content users; grouping at least one of the one or more suspicious content owners and at least one of the one or more suspicious content users into a group 1102; analyzing the group 1102 for determining whether the at least one suspicious content owner and the at least one suspicious content user constitute an abusive entity; and in response to a positive determination, generating a notification including the at least one suspicious content owner and the at least one suspicious content user.

While examples have been described in the general context of program modules that execute in conjunction with an application program that runs on an operating system on a computer, those skilled in the art will recognize that examples may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which aspects are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 14:
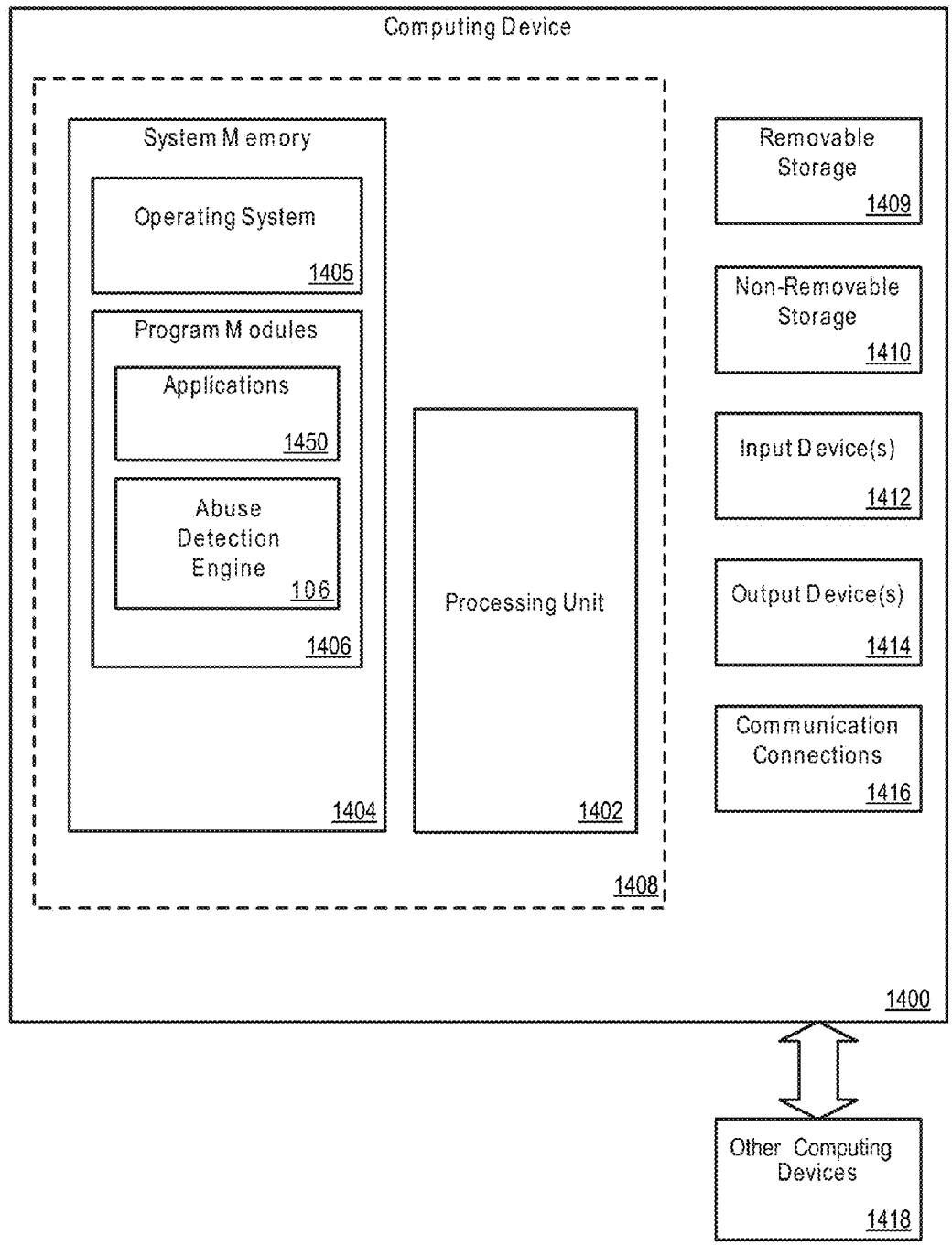
FIG. 14 is a block diagram illustrating one example of the physical components of a computing device.
Figure 15A:
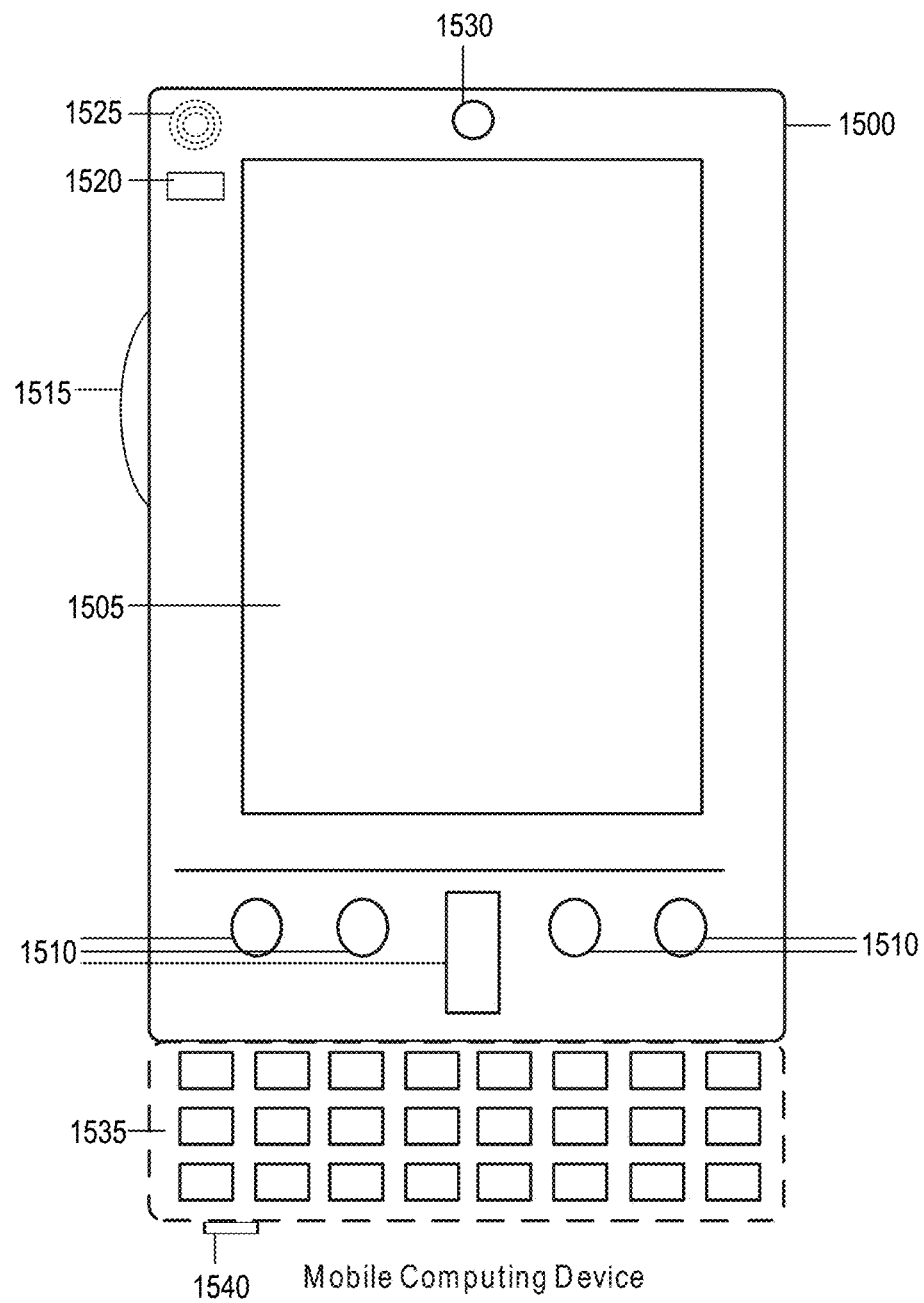
FIGS. 15A and 15B are simplified block diagrams of a mobile computing device.
Figure 15B:
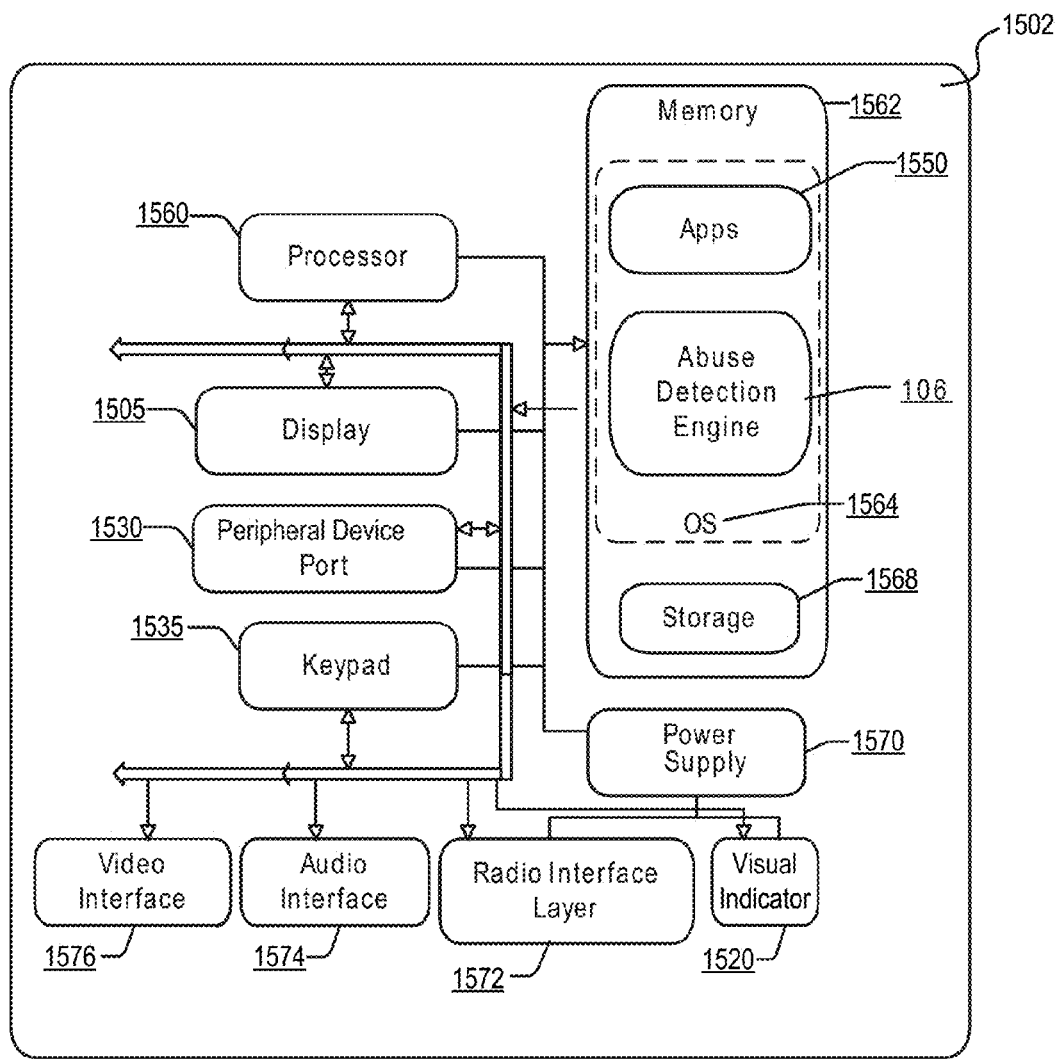
Figure 16:
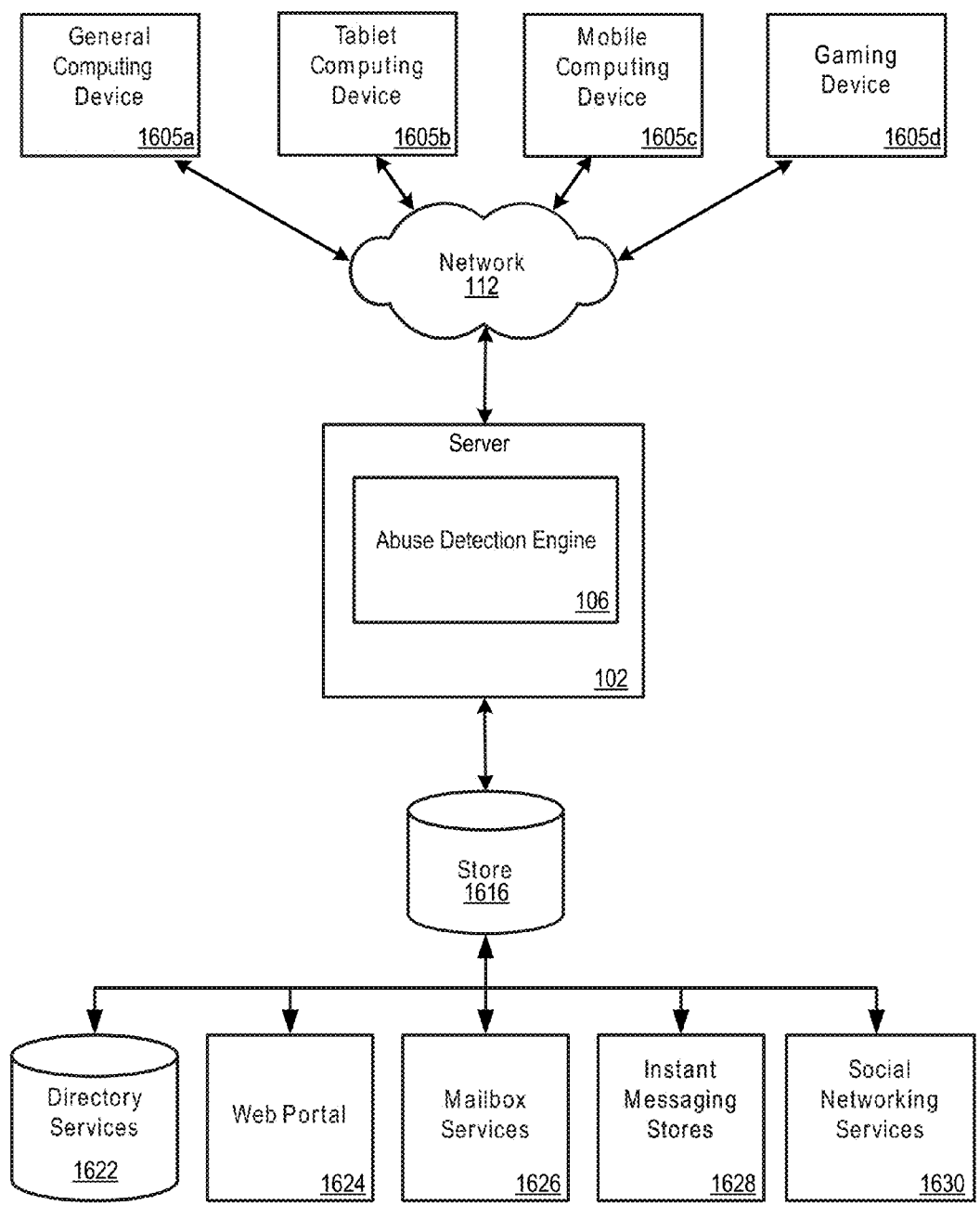
FIG. 16 is a simplified block diagram of a distributed computing system.

FIG. 14-16 and the associated descriptions provide a discussion of a variety of operating environments in which examples are practiced. However, the devices and systems illustrated and discussed with respect to FIGS. 14-16 are for purposes of example and illustration and are not limiting of a vast number of computing device configurations that are utilized for practicing aspects, described herein.

FIG. 14 is a block diagram illustrating physical components (i.e., hardware) of a computing device 1400 with which examples of the present disclosure are be practiced. In a basic configuration, the computing device 1400 includes at least one processing unit 1402 and a system memory 1404. According to an aspect, depending on the configuration and type of computing device, the system memory 1404 comprises, but is not limited to, volatile storage (e.g., random access memory), non-volatile storage (e.g., read-only memory), flash memory, or any combination of such memories. According to an aspect, the system memory 1404 includes an operating system 1405 and one or more programming modules 1406 suitable for running software applications 1450. According to an aspect, the system memory 1404 includes the abuse detection engine 106. The operating system 1405, for example, is suitable for controlling the operation of the computing device 1400. Furthermore, aspects are practiced in conjunction with a graphics library, other operating systems, or any other application program, and is not limited to any particular application or system. This basic configuration is illustrated in FIG. 14 by those components within a dashed line 1408. According to an aspect, the computing device 1400 has additional features or functionality. For example, according to an aspect, the computing device 1400 includes additional data storage devices (removable and/or non-removable) such as, for example, magnetic disks, optical disks, or tape. Such additional storage is illustrated in FIG. 14 by a removable storage device 1409 and a non-removable storage device 1410.

As stated above, according to an aspect, a number of program modules and data files are stored in the system memory 1404. While executing on the processing unit 1402, the program modules 1406 (e.g., abuse detection engine 106) performs processes including, but not limited to, one or more of the stages of the method 1300 illustrated in FIG. 13. According to an aspect, other program modules are used in accordance with examples and include applications such as electronic mail and contacts applications, word processing applications, spreadsheet applications, database applications, slide presentation applications, drawing or computer-aided application programs, etc.

According to examples, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 14 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 1400 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 1400 has one or more input device(s) 1412 such as a keyboard, a mouse, a pen, a sound input device, a touch input device, etc. The output device(s) 1414 such as a display, speakers, a printer, etc. are also included according to an aspect. The aforementioned devices are examples and others may be used. According to an aspect, the computing device 1400 includes one or more communication connections 1416 allowing communications with other computing devices 1418. Examples of suitable communication connections 1416 include, but are not limited to, RF transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 1404, the removable storage device 1409, and the non-removable storage device 1410 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1400. According to an aspect, any such computer storage media is part of the computing device 1400. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 15A and 15B illustrate a mobile computing device 1500, for example, a mobile telephone, a smart phone, a tablet personal computer, a laptop computer, and the like, with which aspects may be practiced. With reference to FIG. 15A, an example of a mobile computing device 1500 for implementing the aspects is illustrated. In a basic configuration, the mobile computing device 1500 is a handheld computer having both input elements and output elements. The mobile computing device 1500 typically includes a display 1505 and one or more input buttons 1510 that allow the user to enter information into the mobile computing device 1500. According to an aspect, the display 1505 of the mobile computing device 1500 functions as an input device (e.g., a touch screen display). If included, an optional side input element 1515 allows further user input. According to an aspect, the side input element 1515 is a rotary switch, a button, or any other type of manual input element. In alternative examples, mobile computing device 1500 incorporates more or less input elements. For example, the display 1505 may not be a touch screen in some examples. In alternative examples, the mobile computing device 1500 is a portable phone system, such as a cellular phone. According to an aspect, the mobile computing device 1500 includes an optional keypad 1535. According to an aspect, the optional keypad 1535 is a physical keypad. According to another aspect, the optional keypad 1535 is a "soft" keypad generated on the touch screen display. In various aspects, the output elements include the display 1505 for showing a graphical user interface (GUI), a visual indicator 1520 (e.g., a light emitting diode), and/or an audio transducer 1525 (e.g., a speaker). In some examples, the mobile computing device 1500 incorporates a vibration transducer for providing the user with tactile feedback. In yet another example, the mobile computing device 1500 incorporates input and/or output ports, such as an audio input (e.g., a microphone jack), an audio output (e.g., a headphone jack), and a video output (e.g., a HDMI port) for sending signals to or receiving signals from an external device.

FIG. 15B is a block diagram illustrating the architecture of one example of a mobile computing device. That is, the mobile computing device 1500 incorporates a system (i.e., an architecture) 1502 to implement some examples. In one example, the system 1502 is implemented as a "smart phone" capable of running one or more applications (e.g., browser, e-mail, calendaring, contact managers, messaging clients, games, and media clients/players). In some examples, the system 1502 is integrated as a computing device, such as an integrated personal digital assistant (PDA) and wireless phone.

According to an aspect, one or more application programs 1550 are loaded into the memory 1562 and run on or in association with the operating system 1564. Examples of the application programs include phone dialer programs, e-mail programs, personal information management (PIM) programs, word processing programs, spreadsheet programs, Internet browser programs, messaging programs, and so forth. According to an aspect, the abuse detection engine 106 is loaded into memory 1562. The system 1502 also includes a non-volatile storage area 1568 within the memory 1562. The non-volatile storage area 1568 is used to store persistent information that should not be lost if the system 1502 is powered down. The application programs 1550 may use and store information in the non-volatile storage area 1568, such as e-mail or other messages used by an e-mail application, and the like. A synchronization application (not shown) also resides on the system 1502 and is programmed to interact with a corresponding synchronization application resident on a host computer to keep the information stored in the non-volatile storage area 1568 synchronized with corresponding information stored at the host computer. As should be appreciated, other applications may be loaded into the memory 1562 and run on the mobile computing device 1500.

According to an aspect, the system 1502 has a power supply 1570, which is implemented as one or more batteries. According to an aspect, the power supply 1570 further includes an external power source, such as an AC adapter or a powered docking cradle that supplements or recharges the batteries.

According to an aspect, the system 1502 includes a radio 1572 that performs the function of transmitting and receiving radio frequency communications. The radio 1572 facilitates wireless connectivity between the system 1502 and the "outside world," via a communications carrier or service provider. Transmissions to and from the radio 1572 are conducted under control of the operating system 1564. In other words, communications received by the radio 1572 may be disseminated to the application programs 1550 via the operating system 1564, and vice versa.

According to an aspect, the visual indicator 1520 is used to provide visual notifications and/or an audio interface 1574 is used for producing audible notifications via the audio transducer 1525. In the illustrated example, the visual indicator 1520 is a light emitting diode (LED) and the audio transducer 1525 is a speaker. These devices may be directly coupled to the power supply 1570 so that when activated, they remain on for a duration dictated by the notification mechanism even though the processor 1560 and other components might shut down for conserving battery power. The LED may be programmed to remain on indefinitely until the user takes action to indicate the powered-on status of the device. The audio interface 1574 is used to provide audible signals to and receive audible signals from the user. For example, in addition to being coupled to the audio transducer 1525, the audio interface 1574 may also be coupled to a microphone to receive audible input, such as to facilitate a telephone conversation. According to an aspect, the system 1502 further includes a video interface 1576 that enables an operation of an on-board camera 1530 to record still images, video stream, and the like.

According to an aspect, a mobile computing device 1500 implementing the system 1502 has additional features or functionality. For example, the mobile computing device 1500 includes additional data storage devices (removable and/or non-removable) such as, magnetic disks, optical disks, or tape. Such additional storage is illustrated in FIG. 15B by the non-volatile storage area 1568.

According to an aspect, data/information generated or captured by the mobile computing device 1500 and stored via the system 1502 is stored locally on the mobile computing device 1500, as described above. According to another aspect, the data is stored on any number of storage media that is accessible by the device via the radio 1572 or via a wired connection between the mobile computing device 1500 and a separate computing device associated with the mobile computing device 1500, for example, a server computer in a distributed computing network, such as the Internet. As should be appreciated such data/information is accessible via the mobile computing device 1500 via the radio 1572 or via a distributed computing network. Similarly, according to an aspect, such data/information is readily transferred between computing devices for storage and use according to well-known data/information transfer and storage means, including electronic mail and collaborative data/information sharing systems.

In yet another example, the mobile computing device 1500 incorporates peripheral device port 1540, such as an audio input (e.g., a microphone jack), an audio output (e.g., a headphone jack), and a video output (e.g., a HDMI port) for sending signals to or receiving signals from an external device.

FIG. 16 illustrates one example of the architecture of a system for detecting abusive traffic on a web service 104. Content developed, interacted with, or edited in association with the abuse detection engine 106 is enabled to be stored in different communication channels or other storage types. For example, various documents may be stored using a directory service 1622, a web portal 1624, a mailbox service 1626, an instant messaging store 1628, or a social networking site 1630. The abuse detection engine 106 is operable to use any of these types of systems or the like for automatically detecting abusive traffic on a web service 104, as described herein. According to an aspect, a server 102 provides the abuse detection engine 106 to clients 1605A,B,C,D. As one example, the server 102 is a web server providing the abuse detection engine 106 over the web. The server 102 provides the abuse detection engine 106 over the web to clients 1605 through a network 112. By way of example, the client computing device is implemented and embodied in a personal computer 1605A, a tablet computing device 1605B, a mobile computing device 1605C (e.g., a smart phone), a gaming device 1605D, or other computing device. Any of these examples of the client computing device are operable to obtain content from the store 1616.

Techniques for providing abuse detection on a web service 104 are described. Although examples are described in language specific to structural features and/or methodological acts, it is to be understood that the examples defined in the appended claims are not necessarily limited to the specific features or acts described above. Rather, the specific features and acts are disclosed as example forms of implementing the claimed examples.

A number of methods may be implemented to perform the techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Furthermore, an operation shown with respect to a particular method may be combined and/or interchanged with an operation of a different method in accordance with one or more implementations. Aspects of the methods may be implemented via interaction between various entities discussed above with reference to the user interface.

Aspects, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Examples should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

What is claimed is:

1. A method of detecting abusive traffic on a web service, the method comprising:
   aggregating a set of consumption data, the aggregated set of consumption data including a list of one or more consumption records associated with consumption of digital content via the web service, the one or more consumption records comprising a content owner, a content user, and a date of the consumption;
   identifying one or more suspicious content owners, wherein the one or more suspicious content owners are owners of digital content accessible via the web service;
   identifying one or more suspicious content users, wherein the one or more suspicious content users are consumers of digital content of the one or more suspicious content owners via the web service, and wherein identifying the one or more suspicious content owners comprises:
      generating a list of a plurality of top users of the web service from the aggregated set of consumption data;
      identifying a plurality of content owners associated with content consumed by the plurality of top users;
      for each content owner of the plurality of content owners associated with content consumed by the plurality of top users:
         computing a ratio comparing consumption of content associated with the content owner by the plurality of top users to consumption of content associated with the content owner by all users in the aggregated set of consumption data;
         determining whether the ratio is above a threshold value; and
         in response to a positive determination that the ratio is above the threshold value, determining that the content owner is a suspicious content owner;
   grouping at least one of the one or more suspicious content owners and at least one of the one or more suspicious content users into a group;
   analyzing the group for determining whether the at least one of the one or more suspicious content owners and the at least one of the one or more suspicious content users constitute an abusive entity; and
   in response to a positive determination related to analyzing the group, generating a notification including the at least one of the one or more suspicious content owners and the at least one of the one or more suspicious content users.

2. The method of claim 1, wherein aggregating the set of consumption data comprises aggregating a set of consumption data associated with consumption within a predetermined time period.

3. The method of claim 1, wherein generating the list of the plurality of top users comprises generating a list of a plurality of most active content users in the aggregated set of consumption data.

4. The method of claim 1, wherein consuming the digital content via the web service comprises:
   subscribing to the web service for a subscription time period; and
   streaming or downloading content from the web service during the subscription time period.

5. The method of claim 4, wherein generating the list of the plurality of top users comprises generating a list of content users who trigger royalties in an amount that exceeds a price associated with the web service subscription.

6. The method of claim 1, wherein identifying the one or more suspicious content users comprises:
   generating a list of active users from the aggregated set of consumption data;
   for each active user in the list of active users, identifying a predetermined number of top content owners, wherein the predetermined number of top content owners comprise the content owners associated with content most consumed by the active user;
   determining whether the predetermined number of top content owners includes a given suspicious content owner of the one or more suspicious content owners;
   in response to a positive determination that the predetermined number of top content owners includes the given suspicious content owner, identifying a number of consumptions of content associated with the given suspicious content owner;
   determining whether the number of consumptions is above a consumption threshold value; and
   in response to a positive determination that the number of consumptions is above the consumption threshold value, determining that the active user is one of the one or more suspicious content users.

7. The method of claim 1, wherein grouping the at least one of the one or more suspicious content owners and the at least one of the one or more suspicious content users into the group comprises:

modeling traffic between the one or more suspicious content owners and the one or more suspicious content users in a graph; and using a graph search algorithm to identify one or more of:
connections between multiple content users; or
connections between multiple content owners.

8. The method of claim 1, wherein analyzing the group comprises analyzing metrics associated with the one or more suspicious content owners and the one or more suspicious content users in the group, the one or more metrics including one or more of:
a number of suspicious content users in the group;
a number of suspicious content owners in the group;
a number of consumptions of content by suspicious content users in the group;
a number of consumptions of content by any content user;
for each suspicious content owner in the group, a number of suspicious content users in the group who consumed content owned by the suspicious content owner;
for each suspicious content owner in the group, a number of all content users who consumed content owned by the suspicious content owner;
a number of consumptions of content owned by suspicious content owners in the group;
a number of consumptions of content owned by any content owner;
for each suspicious content user in the group, a number of suspicious content owners in the group who own content consumed by the suspicious content user; and
for each suspicious content user in the group, a number of all content owners who own content consumed by the suspicious content user.

9. The method of claim 8, wherein analyzing the group comprises:
for each suspicious content owner in the group:
calculating a first percentage by dividing the number of consumptions of content by the suspicious content users in the group by the number of consumptions of content by any content user;
calculating a second percentage by dividing the number of suspicious content users in the group who consumed content owned by the suspicious owner by the number of all content users who consumed content owned by the suspicious content owner;
computing a confidence of the first percentage and the second percentage;
determining whether the confidence of the first percentage and the second percentage is above a confidence threshold value; and
in response to a positive determination that the confidence of the first percentage and the second percentage is above the confidence threshold value, determining that the suspicious content owner is one of the one or more suspicious content owners that constitute the abusive entity.

10. The method of claim 9, further comprising:
for each suspicious content user in the group:
calculating a third percentage by dividing the number of consumptions of content owned by suspicious content owners in the group by the number of consumptions of content owned by any content owner;
calculating a fourth percentage by dividing the number of suspicious content owners in the group who own content consumed by the suspicious content user by the number of all content owners who own content consumed by the suspicious content user;
computing a confidence of the third percentage and the fourth percentage;
determining whether the confidence of the third percentage and the fourth percentage is above the confidence threshold value; and
in response to a positive determination that the confidence of the third percentage and the fourth percentage is above the threshold value, determining that the suspicious content user is one of the one or more suspicious content users that constitute the abusive entity.

11. The method of claim 1, further comprising taking at least one action, wherein the at least one action comprises one or more of:
sending the notification to a legal department for requesting rights for accessing personal information associated with the abusive entity;
sending the notification to a company label associated with the at least one of the one or more suspicious content owners constituting the abusive entity;
sending the notification to the at least one of the one or more suspicious content owners and the at least one of the one or more suspicious content users constituting the abusive entity; and
sending the notification to a payments department for holding payment of royalties to the at least one of the one or more suspicious content owners constituting the abusive entity, wherein the royalties are associated with consumption of content owned by the at least one of the one or more suspicious content owners.

12. The method of claim 11, wherein prior to taking the at least one action, determining which action or actions of the at least one action to take, wherein the determination is based on a confidence that the at least one suspicious content owner and the at least one suspicious content user constitute the abusive entity.

13. The method of claim 1, wherein the digital content includes at least one of:
a music file;
a video file; and
a digital book.

14. The method of claim 1, wherein the consumption of the digital content via the web service includes:
downloading the digital content; and
streaming the digital content.

15. A computing device for detecting abusive traffic on a web service, the computing device comprising:
a processor, a memory, and an output device for presenting a visual output to a user, the visual output comprising a user interface of an application, the computing device operable to:
aggregate a set of consumption data, the aggregated set of consumption data including a list of one or more consumption records associated with consumption of digital content via the web service within a predetermined time period, the one or more consumption records comprising a content owner, a content user, and a date of the consumption;
identify one or more suspicious content owners, wherein the one or more suspicious content owners are owners of digital content accessible via the web service, and wherein in identifying the one or more suspicious content users, the computing device is operable to:
generate a list of active users from the aggregated set of consumption data;
for each active user in the list of active users, identify a predetermined number of top content owners, wherein the predetermined number of top content owners are content owners associated with content most consumed by the active user;

determine whether the predetermined number of top content owners includes a given suspicious content owner of the one or more suspicious content owners;

in response to a positive determination that the predetermined number of top content owners includes the given suspicious content owner, identify a number of consumptions of content associated with the given suspicious content owner;

determine whether the number of consumptions is above a threshold value; and in response to a positive determination that the number of consumptions is above the threshold value, determine that the active user is a suspicious content user;

identify one or more suspicious content users, wherein the one or more suspicious content users are consumers of digital content of the one or more suspicious content owners via the web service;

group the at least one of the one or more suspicious content owners and the at least one of the one or more suspicious content users into a group;

analyze the group for determining whether the at least one of the one or more suspicious content owners and the at least one of the one or more suspicious content user constitute an abusive entity; and in response to a positive determination related to analyzing the group, generating a notification including the at least one of the one or more suspicious content owners and the at least one of the one or more suspicious content users.

16. The computing device of claim 15, wherein in identifying the one or more suspicious content owners, the computing device is operable to:

generate a list of a plurality of top users of the web service from the aggregated set of consumption data;

identify a plurality of content owners associated with content consumed by the plurality of top users;

for each content owner of the plurality of content owners associated with content consumed by the plurality of top users, compute a ratio comparing consumption of content associated with the content owner by the plurality of top users to consumption of content associated with the content owner by all users in the aggregated set of consumption data;

determine whether the ratio is above a consumption threshold value; and in response to a positive determination that the ratio is above the consumption threshold value, determine that the content owner is one of the one or more suspicious content owners.

17. The computing device of claim 15, wherein in analyzing the group, the computing device is operable to:

analyze metrics associated with the one or more suspicious content owners and the one or more suspicious content users in the group, the one or more metrics including one or more of:

a number of suspicious content users in the group;

a number of suspicious content owners in the group;

a number of consumptions of content by the suspicious content users in the group;

a number of consumptions of content by any content user;

for each suspicious content owner in the group, a number of suspicious content users in the group who consumed content owned by the suspicious content owner;

for each suspicious content owner in the group, a number of all content users who consumed content owned by the suspicious content owner;

a number of consumptions of content owned by the suspicious content owners in the group;

a number of consumptions of content owned by any content owner;

for each suspicious content user in the group, a number of suspicious content owners in the group who own content consumed by the suspicious content user; and for each suspicious content user in the group, a number of all content owners who own content consumed by the suspicious content user;

for each suspicious content owner in the group:

calculate a first percentage by dividing the number of consumptions of content by suspicious content users in the group by the number of consumptions of content from any content user;

calculate a second percentage by dividing the number of suspicious content users in the group who consumed content owned by the suspicious content owner by the number of all content users who consumed content owned by the suspicious content owner;

compute a first confidence from the first percentage and the second percentage;

determine whether the first confidence is above a first threshold value;

in response to a positive determination based on the first threshold value, determine that the suspicious content owner is one of the one or more suspicious content owners that constitute the abusive entity; and for each suspicious content user in the group:

calculate a third percentage by dividing the number of consumptions of content owned by suspicious content owners in the group by the number of consumptions of content owned by any content owner;

calculate a fourth percentage by dividing the number of suspicious content owners in the group who own content consumed by the suspicious content user by the number of all content owners who own content consumed by the suspicious content user;

compute a second confidence from the third percentage and the fourth percentage;

determine whether the second confidence is above a second threshold value; and in response to a positive determination based on the second threshold value, determine that the suspicious content user is one of the one or more suspicious content users that constitute the abusive entity.

18. The computing device of claim 15, wherein the computing device is further operable to perform at least one action, the at least one action comprising:

sending the notification to a legal department for requesting rights for accessing personal information associated with the abusive entity;

sending the notification to a company label associated with the at least one of the one or more suspicious content owners constituting the abusive entity;

sending the notification to the at least one of the one or more suspicious content owners and the at least one of the one or more suspicious content users constituting the abusive entity; and sending the notification to a payments department for holding payment of royalties to the at least one of the one or more suspicious content owners constituting the abusive entity, wherein the royalties are associated with consumption of content owned by the at least one of the one or more suspicious content owners.

19. A computer readable storage medium containing computer executable instructions which, when executed by a computer, perform a method for detecting abusive traffic on a web service, the method comprising:

aggregating a set of consumption data, the aggregated set of consumption data including a list of one or more consumption records associated with consumption of digital content via the web service within a defined time period, the one or more consumption records comprising a content owner, a content user, and a date of the consumption;

identifying one or more suspicious content owners, wherein the one or more suspicious content owners are owners of digital content accessible via the web service and wherein identifying one or more suspicious content owners comprises:

generating a list of a plurality of top users of the web service from the aggregated set of consumption data;

identifying a plurality of content owners associated with content consumed by the plurality of top users;

for each content owner of the plurality of content owners associated with content consumed by the plurality of top users, computing a ratio comparing consumption of content associated with the content owner by the plurality of top users to consumption of content associated with the content owner by all users in the aggregated set of consumption data;

determining whether the ratio is above a first threshold value; and in response to a positive determination related to the first threshold value, determining that the content owner is a suspicious content owner;

identifying one or more suspicious content users, wherein the one or more suspicious content users are consumers of digital content of the one or more suspicious content owners via the web service and wherein identifying one or more suspicious content users comprises:

generating a list of active users from the aggregated set of consumption data;

for each active user in the list of active users, identifying a predetermined number of top content owners, wherein the predetermined number of top content owners are the content owners associated with content most consumed by the active user;

determining whether the predetermined number of top content owners includes a given suspicious content owner of the one or more suspicious content owners;

in response to a positive determination that the predetermined number of top content owners include the given suspicious content owner, identifying a number of consumptions of content associated with the given suspicious content owner;

determining whether the number of consumptions is above a second threshold value; and in response to a positive determination related to the second threshold value, determining that the content user is a suspicious content user;

grouping at least one of the one or more suspicious content owners and at least one of the one or more suspicious content users into a group;

analyzing the group for determining whether the at least one of the one or more suspicious content owners and the at least one of the one or more suspicious content user constitute an abusive entity; and in response to a positive determination related to analyzing the group, generating a notification including the at least one of the one or more suspicious content owners and the at least one of the one or more suspicious content users.

20. The computer readable storage medium of claim 19, wherein the method further comprises performing at least one action, the at least one action comprising:

sending the notification to a legal department for requesting rights for accessing personal information associated with the abusive entity;

sending the notification to a company label associated with the at least one suspicious content owner constituting the abusive entity;

sending the notification to the at least one of the one or more suspicious content owners and the at least one of the one or more suspicious content users constituting the abusive entity; and sending the notification to a payments department for holding payment of royalties to the at least one of the one or more suspicious content owners constituting the abusive entity, wherein the royalties are associated with consumption of content owned by the at least one of the one or more suspicious content owners.

* * * * *